US010049565B1

(12) United States Patent
McWhirter et al.

(10) Patent No.: US 10,049,565 B1
(45) Date of Patent: Aug. 14, 2018

(54) WIRELESS ELECTRICAL APPARATUS CONTROLLER AND METHOD OF USE

(71) Applicant: Wireless Telematics LLC, La Jolla, CA (US)

(72) Inventors: William D. McWhirter, Mason, OH (US); Gregory A. Kimmel, La Jolla, CA (US); John S. Weaver, Cincinnati, OH (US); Allan L. Ross, San Diego, CA (US)

(73) Assignee: Wireless Telematics LLC, La Jolla, CA (US)

( * ) Notice: Subject to any disclaimer, the term of this patent is extended or adjusted under 35 U.S.C. 154(b) by 0 days.

(21) Appl. No.: 15/235,218

(22) Filed: Aug. 12, 2016

Related U.S. Application Data

(63) Continuation-in-part of application No. 14/463,250, filed on Aug. 19, 2014, now Pat. No. 9,418,543, which is a continuation of application No. 13/829,389, filed on Mar. 14, 2013, now abandoned, which is a continuation-in-part of application No. 12/915,953, filed on Oct. 29, 2010, now Pat. No. 8,421,588, which is a continuation-in-part of application No. 10/875,140, filed on Jun. 23, 2004, now Pat. No. 7,847,706.

(51) Int. Cl.
*G08C 17/02* (2006.01)
*H04L 29/06* (2006.01)
*G08C 15/02* (2006.01)

(52) U.S. Cl.
CPC ............. *G08C 17/02* (2013.01); *G08C 15/02* (2013.01); *G08C 2201/42* (2013.01); *G08C 2201/91* (2013.01); *H04L 65/1003* (2013.01)

(58) Field of Classification Search
CPC .............................. G06K 7/0008; G08C 17/02
USPC .......................................................... 340/4.3
See application file for complete search history.

(56) References Cited

U.S. PATENT DOCUMENTS

| | | | |
|---|---|---|---|
| 4,368,408 | A | 1/1983 | Marcus |
| 4,454,509 | A | 6/1984 | Buennagel et al. |
| 5,040,331 | A | 8/1991 | Merendino et al. |

(Continued)

FOREIGN PATENT DOCUMENTS

| | | | |
|---|---|---|---|
| CN | 203104865 | U | 7/2013 |
| CN | 103313487 | A | 9/2013 |

(Continued)

*Primary Examiner* — Vernal Brown
(74) *Attorney, Agent, or Firm* — Lodestone Legal Group; Jeromye V. Sartain

(57) ABSTRACT

A device for controlling at least one electrical apparatus comprising a microprocessor wired to an RF transceiver, the microprocessor storing operating protocol commands as sent over a wireless network, the RF transceiver and microprocessor being configured in cooperation with software code residing in the microprocessor to receive real-time data as sourced from a network time source of the wireless network, and a clock circuit connected to the microprocessor and configured for storing the real-time data, whereby the device controls power to the electrical apparatus according to the operating protocol commands at real-time as obtained from the wireless network by which the operating protocol commands are sent and as kept by the clock circuit, thus eliminating the need for a separate GPS receiver in the device for receiving real-time data.

22 Claims, 9 Drawing Sheets

(56) References Cited

U.S. PATENT DOCUMENTS

| | | | |
|---|---|---|---|
| 5,089,814 A | 2/1992 | DeLuca et al. | |
| 5,165,465 A | 11/1992 | Kenet | |
| 5,254,908 A | 10/1993 | Alt et al. | |
| 5,390,166 A * | 2/1995 | Rohani | H04B 7/02 370/330 |
| 5,477,228 A | 12/1995 | Tiwari et al. | |
| 5,661,468 A | 8/1997 | Marcoux | |
| 5,805,530 A | 9/1998 | Youngberg | |
| 5,859,595 A | 1/1999 | Yost | |
| 5,924,486 A | 7/1999 | Ehlers et al. | |
| 6,108,614 A | 8/2000 | Lincoln et al. | |
| 6,188,181 B1 | 2/2001 | Sinha et al. | |
| 6,204,615 B1 | 3/2001 | Levy | |
| 6,236,331 B1 | 5/2001 | Dussureault | |
| 6,236,332 B1 | 5/2001 | Conkright et al. | |
| 6,330,516 B1 | 12/2001 | Kammeter | |
| 6,374,101 B1 | 4/2002 | Gelbien | |
| 6,393,306 B1 | 5/2002 | Hobbi | |
| 6,788,218 B2 | 9/2004 | Sudolcan | |
| 6,836,099 B1 | 12/2004 | Amarillas et al. | |
| 6,873,573 B2 | 3/2005 | Pikula et al. | |
| 6,876,670 B1 | 4/2005 | Budrikis et al. | |
| 6,993,417 B2 | 1/2006 | Osann, Jr. | |
| 7,006,006 B2 | 2/2006 | Witkow et al. | |
| 7,310,327 B2 | 12/2007 | Fehr | |
| 7,501,941 B2 | 3/2009 | Arnold et al. | |
| 7,847,706 B1 * | 12/2010 | Ross | G08C 17/02 340/12.52 |
| 8,497,773 B2 | 7/2013 | Arnold et al. | |
| 8,742,694 B2 | 6/2014 | Bora et al. | |
| 8,912,898 B2 | 12/2014 | Arnold et al. | |
| 9,049,753 B1 | 6/2015 | Wassel et al. | |
| 9,258,685 B2 | 2/2016 | Ahmad et al. | |
| 9,418,543 B1 * | 8/2016 | Ross | G08C 17/02 |
| 2002/0068544 A1 * | 6/2002 | Barzilay | H04L 12/2818 455/406 |
| 2002/0080029 A1 * | 6/2002 | Menard | G08B 1/08 340/541 |
| 2002/0169539 A1 | 11/2002 | Menard et al. | |
| 2003/0140261 A1 | 7/2003 | Takasaki et al. | |
| 2003/0210126 A1 | 11/2003 | Kanazawa | |
| 2003/0222587 A1 | 12/2003 | Dowling, Jr. et al. | |
| 2004/0176132 A1 * | 9/2004 | Thrasher | H04L 12/2803 455/556.1 |
| 2004/0203437 A1 * | 10/2004 | Burch | H04W 24/00 455/67.11 |
| 2015/0002276 A1 | 1/2015 | Kicklighter et al. | |

FOREIGN PATENT DOCUMENTS

| | | |
|---|---|---|
| CN | 103313488 A | 9/2013 |
| CN | 203537606 U | 4/2014 |
| CN | 203951660 U | 11/2014 |
| CN | 204119578 U | 1/2015 |
| CN | 105431891 A | 3/2016 |
| EP | 1074441 A1 | 3/2000 |
| EP | 1251721 A1 | 10/2002 |
| WO | 03043384 A1 | 5/2003 |

* cited by examiner

WIRELESS ELECTRICAL APPARATUS CONTROLLER AND METHOD OF USE

RELATED APPLICATIONS

This is a continuation-in-part of a prior filed and currently pending application having Ser. No. 14/463,250 and filing date of Aug. 19, 2014, itself a continuation of a prior filed and now abandoned application having Ser. No. 13/829,389 and filing date of Mar. 14, 2013, itself a continuation-in-part application of a prior filed application having Ser. No. 12/915,953 and filing date of Oct. 29, 2010, now issued as U.S. Pat. No. 8,421,588 on Apr. 16, 2013, itself a continuation-in-part application of a prior filed application having Ser. No. 10/875,140 and filing date of Jun. 23, 2004, now issued as U.S. Pat. No. 7,847,706 on Dec. 7, 2010.

INCORPORATION BY REFERENCE

Applicants hereby incorporate herein by reference any and all U.S. patents and U.S. patent applications cited or referred to in this application.

BACKGROUND OF THE INVENTION

Field of the Invention

Aspects of this invention relate generally to electrical apparatus controllers, and more particularly to wireless electrical apparatus control devices.

Description of Related Art

The following art defines the present state of this field:

U.S. Pat. No. 4,454,509 to Buennagel et al. is directed to a load management system which includes a central message generator and a plurality of addressable remote load controllers which selectively connect and disconnect high power deferrable loads to and from a power source in response to transmitted messages. The load controllers include means for translating coded tone pair inputs into digital data. Tones selected from three such tone pairs are used in one scheme, where a tone selected from the first tone pair is used for the initial bit of a message, and subsequent tones are alternately selected from the remaining two tone pairs or the remaining bits. One of the tones of the first tone pair is utilized as a test tone which initiates a test routine sequence. The test tone can be transmitted by a portable, low power transmitter to test the functioning of the remote units. A message format includes two code sets, a zone code set and a command/address code set. Each load controller has a preprogrammed zone identifier and a preprogrammed address identifier, and is responsive to a command/address code message only when the last received zone code message has identified the preprogrammed zone identifier of that load controller and the command/address message indicates the preprogrammed address identifier of that load controller. All load controllers having a common zone identifier are responsive to a scram instruction message which identifies that zone.

U.S. Pat. No. 5,254,908 to Alt et al. is directed to a sign board lighting control system for remotely controlling the lighting of a plurality of sign boards which includes a radio transmitting device at a central location, and a radio receiving device and a lighting control unit at each sign board location. During set-up of a sign board, programming signals designating the mode of operation and the location of the sign board are transmitted by radio to the control unit associated with each sign board. Subsequently, timing signals containing a multiple-digit computer generated code designating the time of day and the time of sunrise and sunset on a particular day within particular latitudinal zones are transmitted by radio to the control units of all sign boards. Each lighting control unit interprets and responds to the timing signals in accordance with previously received programming signals to control the illumination of the sign board in accordance with a predetermined lighting protocol.

U.S. Pat. No. 5,477,228 to Tiwari et al. is directed to differential correction signals for a global positioning system (GPS), which operates with signals from a plurality of orbiting satellites, are provided in a first standard format, such as a RTCM SC-104 format, for each satellite in view of a reference receiver station. The differential correction signals include range error correction signals and range rate error correction information. The differential correction signals are then encoded according to a second standard format, such as the RDS format. The transmission time of the signals in the second standard format are then prioritized. A broadcast transmitter, such as a broadcast FM transmitter, is then modulated by the prioritized signals in the second standard format and a receiver receives and demodulates the broadcast signal. The broadcast prioritized signals in the second standard format are then decoded to provide differential correction signals in the first standard format. Various prioritization schemes are provided such as: prioritizing according to the maximum range acceleration rate for the various satellites; prioritizing according to the range acceleration rate for the various satellites exceeding a predetermined absolute value; prioritizing according to range error correction signals exceeding a predetermined absolute value; and prioritizing according to the range error or acceleration corrections signals for the various satellites. In addition to prioritizing, the RTCM signals is compressed and a ⅛ minute time clock is used to simplify processing at a user receiver.

U.S. Pat. No. 5,661,468 to Marcoux is directed to a system for remote control of electrical load devices, particularly electrical lighting where the commands are broadcast over a radio pager system. A radio pager receiver is located within or nearby the electrical light fixture and is normally in a standby state, receives the commands broadcast. The radio pager receiver is connected to a computer processor and electronic circuitry. The computer processor interprets the commands and instructs the electronic circuitry to perform a desired operation. These operations include but are not limited to turning an electrical light element or group of electrical light elements on or off, dimming the light element or reprogramming the electrical light element to be included in a different control group of lights. Before the operation is accomplished, the computer processor checks for the appropriate security code entry. In addition, there are protection mechanisms built into the computer processor so that if the decoding of the commands indicates that a large block of devices is to be turned on at the same time, the operation will be staggered so as to prevent a huge inrush of current. One preferred embodiment of this device is to be installed in a typical exterior roadway light fixture.

U.S. Pat. No. 5,936,362 to Alt et al. is directed to a control system for remotely controlling the application of electric power to a plurality of electric apparatuses that includes a radio transmitting device at a central location, and a radio receiving device and a control unit at each electrical apparatus location. Programming signals designating the operating protocol or mode and the location of the electrical apparatus are transmitted by a radio programming signal to the control unit associated with each electrical apparatus. Subsequently, timing reference signals are transmitted to the control units of all electrical apparatus. Each control unit interprets and responds to the timing signals in accordance with previously received programming signals to control the application of electric power to the electrical apparatus in accordance with a predetermined operating protocol.

U.S. Pat. No. 6,236,332 to Conkright et al. is directed to a two-way wireless communications system for permitting the control, monitoring and collection of data from electrical apparatus and includes a host computer, control and monitoring units remotely located from the host computer, and subscriber software for establishing communication protocol with each unit. The host computer includes a customer interface gateway which handles communications from the subscriber software to the host system, a wireless service gateway which handles all communications with the remotely located units, and a product data processor for processing data obtained from either a customer via the subscriber software or a particular remote unit. The subscriber software permits customers to have desktop control of their electrical apparatus associated with a remote unit. Each remote unit contains a motherhood, power supply, and modem. Each unit is capable of real-time monitoring and control of the electrical apparatus associated with the unit.

U.S. Pat. No. 6,873,573 to Pikula et al. is directed to a wireless synchronous time system comprising a primary master event device and secondary slave devices. The primary event device receives a global positioning system "GPS" time signal, processes the GPS time signal, receives a programmed instruction, and broadcasts or transmits the processed time signal and the programmed instruction to the secondary slave devices. The secondary slave devices receive the processed time signal and the programmed instruction, select an identified programmed instruction, display the time, and execute an event associated with the programmed instruction. The primary event device and the secondary devices further include a power interrupt module for retaining the time and the programmed instruction in case of a power loss.

U.S. Pat. No. 6,876,670 to Budrikis et al. is directed to a system that allows routers in a digital communications network, such as the Internet, to be given the time awareness that is necessary for timely transfer of real time signals in the form of digital data packets. Timing information generated at the source of the signal is included in the packets in the form of first and second time stamps, which are used by network routers to establish dispatch deadlines by which the packets must be forwarded to ensure time-faithful reconstruction of the real time signal at the destination. The same timing information can be used at the destination to synchronize the clock for presentation of the real time signal to the source clock. The first and second time stamps (a differential time and a dispatch time) are derived by a transmitter unit (100) from a counter (118) that counts pulses from an oscillator (116) that most advantageously is locked to an integer multiple or a fraction of a universally available time measure. Assuming that the same time measure, or at least a very near replica, is available at routers in the network and at destinations connected to the network, the time stamps marked in the packets can be used by routers to effect scheduling for timely dispatch of the packets.

European Patent Application Publication No. EP 1074441 to Baldenweck is directed to a remote car function control unit having a broadcast message receiver using GSM signals with receiver set using position finding satellite information and setting processor unit. The remote control function setting unit has a broadcast message receiver system setting an information server. There is a position finding system (GPS) determines local position providing messages to a processor unit commanding messages from a GSM system.

U.S. Pat. No. 6,204,615 to Levy is directed to a new and improved outdoor lighting control system for an outdoor lighting system network for automatically sensing, conveying, and recording data relevant to the operation of the lighting system network so that both control and maintenance can be performed more efficiently. At each of plural lamp locations in the network, there is a controller module that receives electric power input and that supplies electric power to the remaining lamp locations. Each controller module has a first relay to deliver current to one or more outdoor illumination lamps at the controller module's location, and a second relay for switching electric power on to a succeeding lamp location. A first current sensor monitors current to the lamps at each lamp location, and a second current sensor monitors current to the remaining locations. The network's power lines form portions of a bi-directional data link via which data is transmitted from each controller module to a command station, and vice versa.

U.S. Pat. No. 6,236,331 to Dussureault is directed to an LED traffic light electronic controller which stabilizes the total output light intensity of the traffic light in order to ensure a constant light intensity of each traffic light color throughout the entire traffic light lifetime. The controller detects the output light intensity of a color, and then automatically adjusts the power input for the LEDs in order to increase the light intensity when needed. The controller works in a closed loop cycle in order to perform real-time control of the light intensity output. Thus, at each moment of the traffic light lifetime, the output light intensity is constant and equivalent to a predetermined standard. This insures traffic safety for the entire traffic light lifetime and also make it last longer. The controller also provides a ballast load when off, and is able to provide an open circuit when the LEDs have exhausted their useful lifespan. The intensity is further controlled by detecting ambient light conditions.

European Patent Application Publication No. EP 1251721 to Zaffarami et al. is directed to an urban remote-surveillance system for street lamps, in which a concentrator module sends, using a very low power transceiver, by means of a polling procedure, a message to each of a plurality of remote-control modules equipped with a very low power transceiver and organized in a hierarchical tree structure, defining in the message the destination module and a receiving/transmitting path consisting of a plurality of intermediate modules able to communicate with each other in succession, at the same frequency and without mutual interference, so as to obtain the necessary geographical coverage also using very low power transceivers.

PCT International Publication No. WO 03/043384 to Wacyk et al. is directed to a new architecture for high frequency (HF) ballast with wireless communication interface. The new architecture integrates RF wireless interface into the ballast. A user control transmits an RF control signal to a second antenna at the ballast site which provides the RF signal to the ballast which activates the fluorescent lamp. The ballast includes a transceiver/receiver, a communication decoder, a power control stage and a power stage. The transceiver/receiver receives the RF signal and communicates it to the communication decoder which acts as an interface to the power stage control. The power stage control controls the power stage that activates the fluorescent lamp.

The communication decoder, power control stage, power stage and transceiver/receiver are located within the ballast enclosure which is an important part of the invention. If the power stage control is digital it may be combined with the communication decoder into one microprocessor or digital controller such as an ASIC. The communication decoder may be a serial interface. The transceiver/receiver is an RF integrated circuit. The ballast further includes an isolator to isolate the transceiver/receiver from the first antenna. The isolator may be capacitive.

U.S. Publication No. 2003/0222587 to Dowling, Jr. et al. is directed to smart lighting devices bearing processors, and networks comprising smart lighting devices, capable of providing illumination, and detecting stimuli with sensors and/or sending signals. Sensors and emitters can, in some embodiments, be removed and added in a modular fashion. Smart lighting devices and smart lighting networks can be used for communication purposes, building automation, systems monitoring, and a variety of other functions.

U.S. Pat. No. 6,330,516 to Kammeter is directed to a branch circuit monitor including a plurality of non-contact current sensors arranged to sense current on each of a plurality of branch circuits, the non-contact current sensors being connected to a common digital signal processor (DSP) module having as inputs the outputs of the current sensors and also voltage inputs from each power source. The digital signal processor is arranged to calculate not only overall energy consumption, but also RMS voltage, RMS current, power factor, real power, and/or apparent power for each branch circuit. Preferably, the non-contact current sensors are in the form of miniature non-contact Rogowski coils or induction transducers. Data from the digital signal processor may be made available via communications protocols such as Modbus RTU or RS232/RS485/422, to any number of remote sites. The individual branch circuit monitors can be wired in a daisy chain or star network configuration and even connected to the Internet via an appropriate interface device.

U.S. Pat. No. 6,993,417 to Osann, Jr. is directed to a system where the existing proliferation of standard electrical junction boxes in a typical home or building implement a form of “Bio-Feedback for Home Energy”, increasing user awareness and enabling more effective and efficient energy usage. Energy-related information is gathered by way of EMAC (Energy Monitoring And Control) points typically installed at standard electrical junction boxes used for power plug receptacles and wall switches. In addition to being visually displayed at the point of energy use or measurement, energy-related information—electrical and thermal—is typically communicated through a powerline or wireless data link to a centrally located intelligent device where it is monitored, analyzed, profiled, viewed, and also used for energy-related control functions. Energy consumption can be alternately displayed in terms of cost-per-time. Energy monitoring may be also added at the electrical breaker box to supplement distributed EMAC points.

U.S. Pat. No. 6,836,099 to Amarillas et al. is directed to an electrical power control apparatus and method for a conventional 60 hertz or other conventional frequency electrical AC power supply voltage waveform to proved an effective output current and voltage to an intended load whereby the output frequency is the same as the input frequency. Using a switching means capable of micro switching the current on and off, and a plurality of substantially equal length and duration interruptions of current on both sides of an AC current oscillation, the output effective voltage and resulting current may be preset and controlled to a pre-programmed output level regardless of input voltage having one or more phases. Or, the output voltage and resulting current may be continually monitored with the load integrated into the circuit being monitored and continually adjusted to yield maximum power use savings while avoiding damage to the components attached to the circuit. Additional embodiments provide for use of the micro chopping device as a voltage regulator, motor controller, light dimmer, line conditioner, and also a circuit breaker for over current protection and as a smart circuit breaker to yield a data stream on individual circuit power usage which can be communicated to a monitoring station locally or by electronic transmission of information to a remote monitoring station. Real time monitoring and adjustment of power usage may be accomplished using such communication and two way communication between the device and communicating monitoring station also allow for real time charges for power usage and deduction from prepaid account for real time power usage.

The prior art described above teaches an apparatus for addressably controlling remote units, a sign board lighting control system, a differential global positioning system using radio data system, a radio paging electrical load control system and device, programmable remote control systems for electrical apparatuses, a control and monitoring system, a wireless synchronous time system, a method and apparatus for transfer of real time signals over packet networks, a remote control method for a process, an intelligent outdoor lighting control system, an LED traffic light intensity controller, an urban remote surveillance system for street lamps, an architecture of ballast with integrated RF interface, universal lighting network methods and systems, a branch circuit monitor, a system for energy sensing analysis and feedback, and an electrical power conservation apparatus and method, but does not teach a wireless electrical apparatus control system that conveniently and effectively enables remote monitoring and control of an electrical apparatus for operation management, efficiency improvement, and failure detection, all from a remote location. Aspects of the present invention fulfill these needs and provide further related advantages as described in the following summary.

SUMMARY OF THE INVENTION

Aspects of the present invention teach certain benefits in construction and use which give rise to the exemplary advantages described below.

The present invention is generally directed to a device for controlling at least one electrical apparatus.

In one exemplary aspect the device comprises a microprocessor wired to an RF transceiver, the microprocessor storing operating protocol commands as sent over a wireless network, the RF transceiver and microprocessor being configured in cooperation with software code residing in the microprocessor to receive real-time data as sourced from a network time source of the wireless network, and a clock circuit connected to the microprocessor and configured for storing the real-time data, whereby the device controls power to the electrical apparatus according to the operating protocol commands at real-time as obtained from the wireless network by which the operating protocol commands are sent and as kept by the clock circuit, thus eliminating the need for a separate GPS receiver in the device for receiving real-time data.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

DETAILED DESCRIPTION OF THE INVENTION

The above described drawing figures illustrate aspects of the invention in at least one of its exemplary embodiments, which are further defined in detail in the following description.

Figure 1:
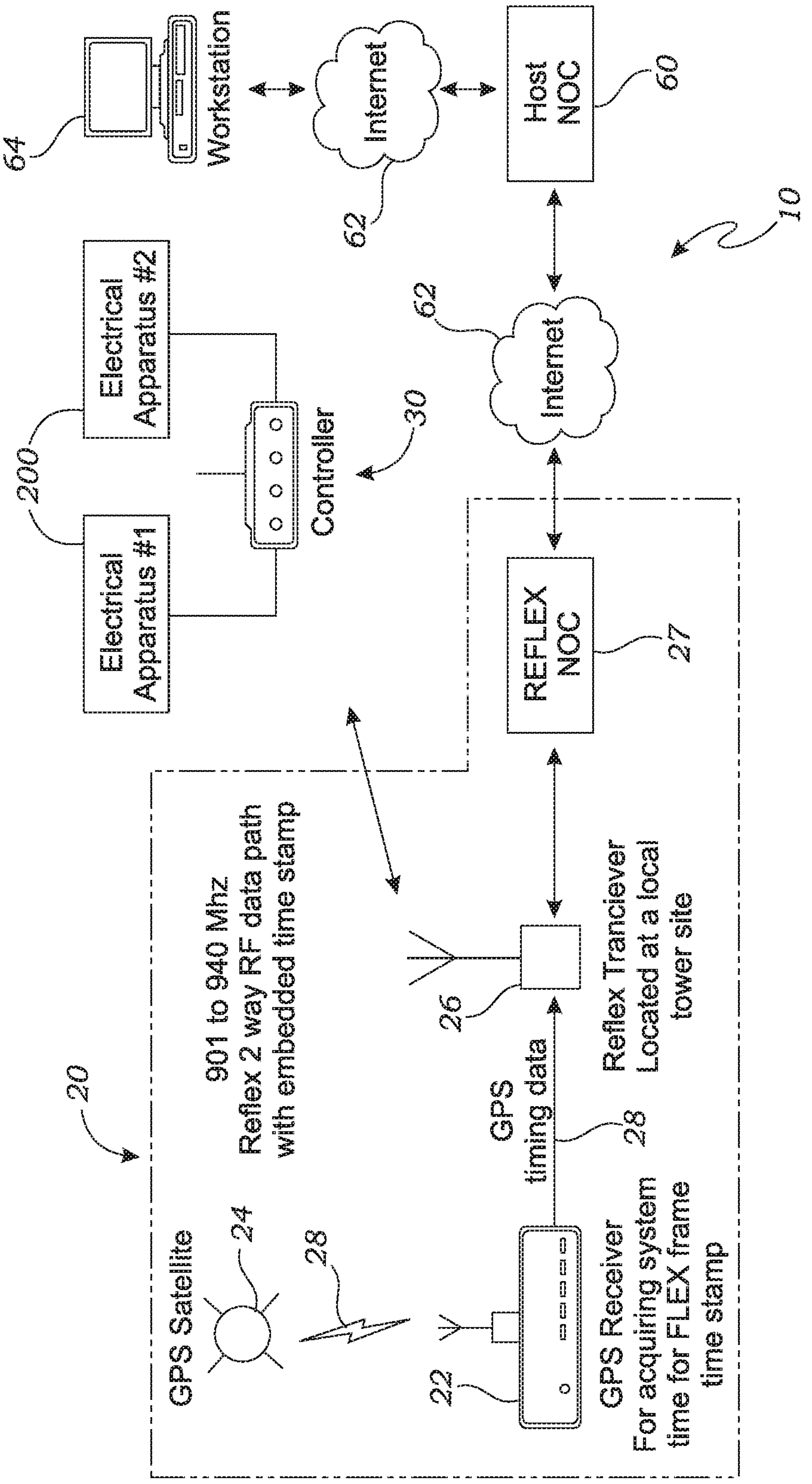
FIG. 1 is a schematic of a first exemplary embodiment of the invention.
Figure 2A:
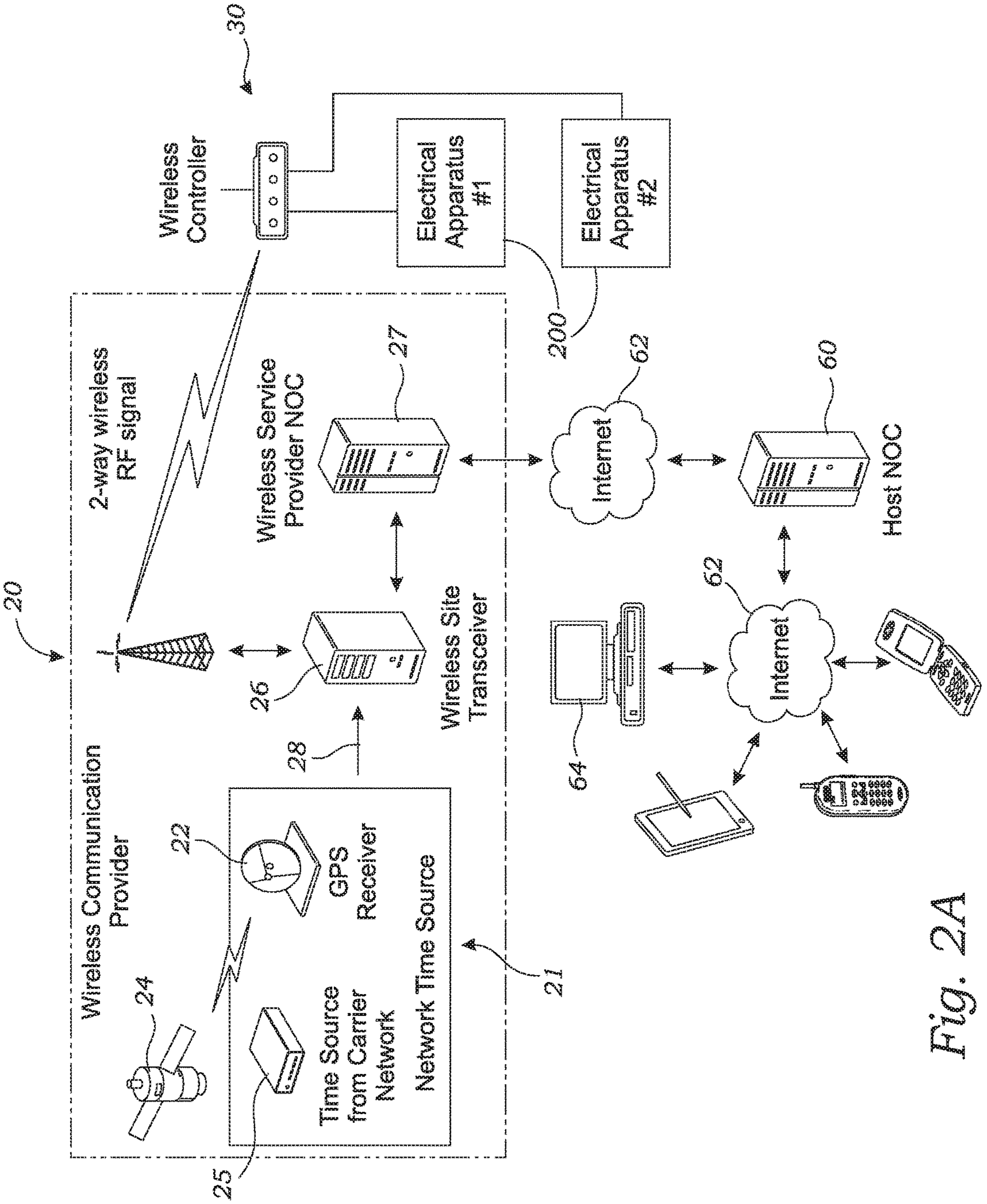
FIG. 2A is a schematic of a second exemplary embodiment of the invention.
Figure 2B:
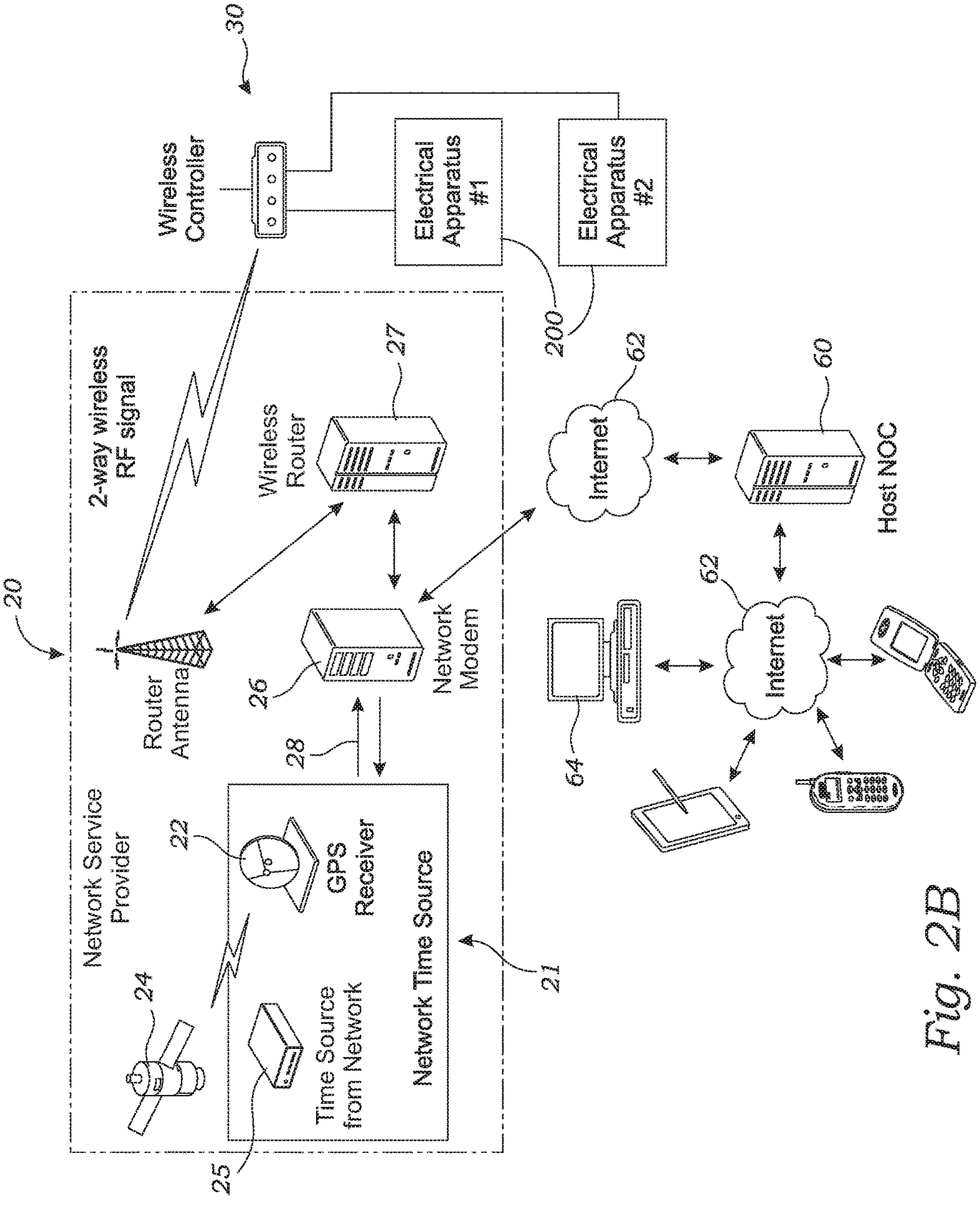
FIG. 2B is a schematic of a third exemplary embodiment of the invention.
Figure 3:
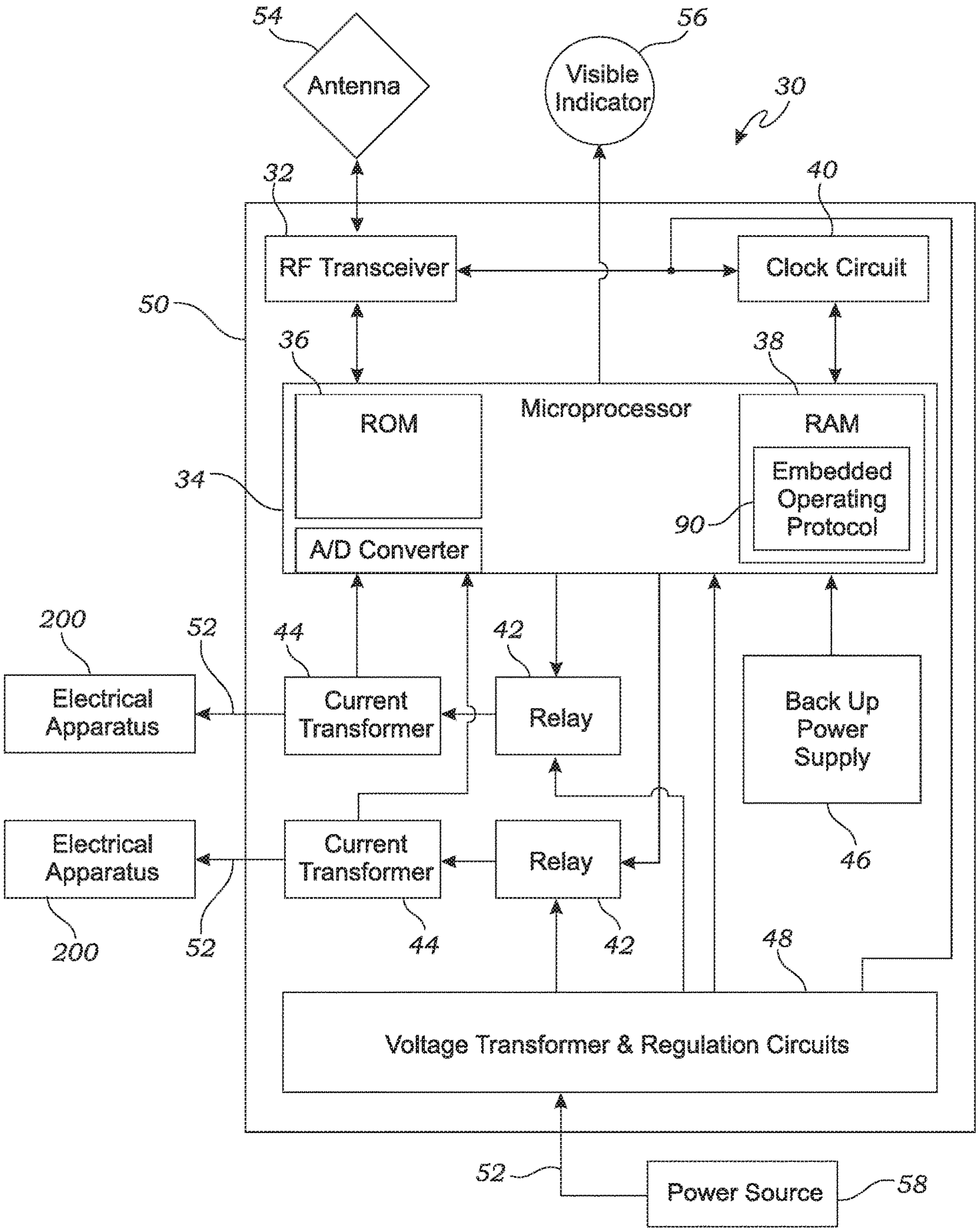
FIG. 3 is a schematic of an exemplary control unit thereof.

With reference to FIGS. 1 and 3, aspects of the present invention are generally directed to a system 10 for remotely controlling and/or monitoring the energy consumption of one or more electrical apparatuses 200 over a wireless network 20, the system 10 comprising one or more processor/transceiver control units 30 connected to the electrical apparatuses 200 and communicating with a host network operations center 60 over the wireless network 20. In the first exemplary embodiment depicted in FIG. 1, the wireless network 20 is a two-way ReFLEX network as is known and used in the art. As such, the wireless network 20 includes a first transceiver 22 configured to acquire and relay real-time data 28 from a global positioning system satellite 24 and a second transceiver 26 configured to receive the real-time data 28 from the first transceiver 22 and to continuously transmit the real-time data 28 to the control unit 30. The processor/transceiver control unit 30 has a third transceiver 32 for receipt of the real-time data 28 and at least one microprocessor 34 wired to the third transceiver 32 for storage of an operating protocol 90 and for processing of the real-time data 28 accordingly. The processor/transceiver control unit 30 further includes a clock circuit 40, such that as the third transceiver 32 receives the real-time data 28 from the second transceiver 26, the microprocessor 34 downloads or extracts the real-time data 28 and thereby stores in and synchronizes the real time clock circuit 40 with real-time, whereby the processor/transceiver control unit 30 controls power to the electrical apparatuses 200 according to the operating protocol 90 at real-time as kept by or stored in the clock circuit 40. As will be explained in more detail below, each control unit 30 also communicates to and from the host network operations center 60 through the wireless network 20 so as to receive operating protocol 90 commands and send messages confirming receipt and execution of such commands and/or to report energy usage and other such information about the remote apparatuses 200, again as controlled by the operating protocol 90 or through direct user query. In this way, a wireless system according to aspects of the present invention operates on substantially continuously or regularly synchronized real-time according to downloaded operating instructions so as to control, monitor and provide feedback regarding the operation of one or more electrical apparatuses, including in some embodiments their energy consumption. It will be appreciated by those skilled in the art that this streamlined approach of downloading and synchronizing to real-time data 28 imbedded and inherent in two-way wireless communication or otherwise sourced from a wireless network has numerous advantages over systems requiring the separate and routine transmission of signals representing system or reference times. Accordingly, it will also be appreciated that any two-way wireless data transmission system now known or later developed in the art that includes imbedded real-time data inherent in the network provider's signal or that contains a network time source 21 from which real-time data can be obtained can be employed without departing from the spirit and scope of the present invention, including but not limited to cellular of any network/protocol type, satellite, wife or wimax, and other such networks now known or later developed, as further demonstrated with reference to FIGS. 2A and 2B discussed in more detail below. It will be further appreciated that while the electrical apparatus 200 is shown and described below in the exemplary embodiment as a light pole, the wireless controller and energy monitoring system 10 of the present invention may be employed in remotely controlling and monitoring virtually any apparatus that is electrically powered, including but not limited to lights and lighting standards, pumps, motors, boilers, compressors, heaters, chillers, condensers, appliances, computers and microprocessors, security systems, sensors, solenoids, switches, valves, clocks, and timers. With any such apparatus, in the exemplary embodiment, the present invention operates by connecting a processor/transceiver control unit 30 to each electrical apparatus 200 to be controlled. The control unit 30 is essentially wired between the power source 58 for the electrical apparatus 200 and the apparatus itself. The control unit's microprocessor 34 stores an operating protocol 90 for each apparatus 200 and communicates operational information over a wireless network 20 to and from a host network operations center 60, which is securely accessible through the Internet 62 and may be generally described as a server or other such computer or computing device connected to and selectively accessible over the Internet or other such network and having stored therein software so as to provide a customer or user interface as discussed further below. According to the operating protocol 90, the processor/transceiver control unit 30 is then capable of controlling each electrical apparatus 200 to which it is wired. Again, the control unit 30 includes a real-time clock circuit 40 for independent and continuing execution of the operating protocol 90, even were the wireless network 20 or host network operations center 60 to be down. The control unit's microprocessor 34 is configured to synchronize the clock circuit 40 with or store in the clock circuit 40 the real-time data 28 imbedded in the wireless network 20's radio frequency ("RF") signal or otherwise sourced from the wireless network 20 when regularly received by the processor/transceiver control unit 30. Aspects of the present invention then benefit users in several ways. First, it allows for powering electrical apparatuses in an automated, systematic way only as needed, thereby conserving energy through reducing the total amount of time an electrical apparatus is powered. Second, and relatedly, aspects of the invention enable users to avoid unnecessary costs associated with a separate device-side GPS receiver for acquisition of real-time and the associated airtime and on-time for the electrical apparatuses they are controlling, resulting in savings through both reduced wireless airtime and energy consumption and reduced maintenance and replacement costs. Third, this wireless, systematic control of electrical apparatuses can increase the performance and safety of the apparatuses in use. Particularly, because the invention includes an on-board, real-time clock in each processor/transceiver control unit, each such control unit is, again, then capable of continuing its operation as desired even when the wireless network or host server is down. And fourth, in some embodiments, the energy consumption of each apparatus can be totalized, reported wirelessly, and thereby acted on in further reducing energy usage, such as by adjusting the apparatus' operating protocol to operate differently or during non-peak hours, and in even detecting device failures or predictive failures. Once more, the wireless network shown and described in the exemplary embodiment of FIG. 1 is a two-way narrowband wireless data network such as that based on the industry-recognized Motorola® ReFLEX™ protocol. Accordingly, the processor/transceiver control unit 30 employs a binary data protocol based on an octet (8 bits representing 1 byte) to communicate with the network 20, whereby data values can be represented as one or multiple bytes depending on the value's range. However, it will again be appreciated that virtually any two-way wireless data transmission system and corresponding data protocol now known or later developed in the art can be employed without departing from the spirit and scope of the present invention. For example, if a cellular-type network was employed, the communication protocol would then be cellular-based but the data would essentially remain the same, even if packeted, packaged, wrapped, or otherwise transmitted differently.

Referring now to FIG. 2A, there is shown a schematic analogous to FIG. 1 here illustrating the system as implemented in connection with any wireless communication network 20, including but not limited to any cellular-type network, now known or later developed as having real-time data inherent in the carrier's or wireless communication provider's signal as broadcast from a wireless site transceiver 26, which network can thus be generally described as a time-based wireless two-way network, whether code division multiple access (CDMA), time division multiple access (TDMA), third generation (3G), fourth generation (4G), long term evolution (LTE), general packet radio service (GPRS), enhanced data rates for global system for mobile communication (GSM) evolution (Edge), or any other such cellular or other two-way network now known or later developed. Furthermore, such broadcast may be substantially continuous or more incremental, in either case still being at frequent regular intervals. As shown, within the network 20 there is some network time source 21, which may be a GPS receiver 22 configured to receive time data as from a satellite 24, a carrier time source 25, such as a cabled or wired site connection, or any other such source of real-time data 28 now known or later developed, which network time source 21 is in communication with the wireless site transceiver 26, whether through a wired or wireless connection. While a transceiver 26 is shown and described, it will be appreciated that any such device in any functional arrangement, whether as a single unit or as a separate transmitter and receiver and whether now known or later developed, may be employed within the network 20. As also shown, the wireless communication network 20 further generally includes a carrier or wireless communication provider network operations center (NOC) 27 that is also in communication with the wireless site transceiver 26, whereby interactions over the Internet or other such network from the host network operations center 60, existing outside of the wireless communication network 20, with the wireless communication provider network operations center 27 are then transmitted over the network 20 by way of the wireless site transceiver 26 to one or more control units 30 as described herein. As such, it will again be appreciated that the real-time data 28 inherent in the wireless communication provider's network signal through which data is transmitted to each controller unit 30 may then be extracted, stored, and utilized by the control unit 30 as herein described, it once more making no real difference whether the network is ReFLEX, cellular, or any other such network—the fundamental principles of the present invention remain unchanged. Accordingly, those skilled in the art will appreciate that the present invention is not limited to the particular network employed and thus any particular protocol in effect and any related data formatting and bundling scheme, but instead is again generally directed in one aspect to a means of providing real-time data to a wireless control unit 30 without having to equip such control unit 30 with its own means of acquiring real-time data, such as being cabled to a local cell site or tower or having an on-board GPS receiver. With further reference to FIG. 2A, it can be seen that in addition to a work station 64, a number of other computer or computing type devices now known or later developed may be employed to interact over the Internet or the like with the host network operations center 60, which is again effectively a user interface, for the purpose, among others, of checking the status of or remotely controlling one or more electrical apparatuses 200 connected to one or more control units 30, such further devices including but not limited to cellular phones or smart phones and tablet devices.

Referring next to FIG. 2B, there is shown a similar schematic to analogous FIGS. 1 and 2A, here illustrating the system as implemented in connection with any other wireless communication network 20 now known or later developed over which the one or more control units 30 may communicate or effectively be connected to the Internet or be "on-line," including but not limited to networks or network protocols commonly known as WiFi, WiMax, Bluetooth, ZigBee, INSTEON, IrDA, wireless USB, Z-Wave, TCP/IP, or any such wired and/or wireless personal area network ("PAN"), local area network ("LAN"), metropolitan area network ("MAN"), or wide area network ("WAN"), alone or in combination, over or through which devices may connect to the Internet and thus to each other. It will be appreciated by those skilled in the art that any and all such wireless networks now known or later developed may vary based on frequency or radio bands used, data rates, security (e.g., encryption or password protection), and other such factors but otherwise operate on similar principles as wireless communication or data exchange platforms of whatever range through which devices may be connected, and relatedly that some of the connections within the network of whatever kind may be wired as by Ethernet cable or the like. According to aspects of this further alternative embodiment, rather than having real-time data inherent in the carrier's or wireless communication provider's signal as in the networks illustrated in FIGS. 1 and 2A, here as illustrated in FIG. 2B, each control unit 30 may acquire or request the time from the network as by simply accessing or "asking" a URL rather than the RF module, in either case advantageously still obtaining the real-time data from the network and avoiding the need for GPS capabilities within the system, or at the remote individual controllers 30 or at the host network operations center 60 for the purpose of "pushing" time data to the controllers 30 as in prior third-party approaches. Therefore, while some networks having native time, such as in the carrier signal's header, as represented schematically in FIG. 2A, can thus be generally described as a time-based wireless two-way network, whether Reflex, CDMA, TDMA, 3G, 4G, LTE, GPRS, Edge, or any other such cellular or other two-way network now known or later developed, so too are other wired or wireless networks able to provide time data even if not native to the network service provider's signal, as represented schematically in FIG. 2B. Furthermore, such broadcast or acquisition of time data may again be substantially continuous or more incremental, in either case still being at frequent regular intervals. In the case of a WiFi or other network, the one or more controllers 30 would simply connect to the Internet through the network (i.e. modem 26 and router 27, analogous to the wireless site transceiver 26 and wireless service provider NOC 27 of FIG. 2A) and "ask" for the time data from a URL (i.e., a website) rather than from the network carrier module or node, which process may again be automatic or semi-automatic and be at frequent regular intervals. By way of illustration and not limitation, whenever time data is to be acquired for setup or synchronization, the controller 30 may execute a "gt" (get time) command request via the network or access a website on the network (over the Internet) such as time.gov so as to obtain real-time data. As shown schematically, within the network 20 there is again some network time source 21, which may be a GPS receiver 22 configured to receive time data as from a satellite 24, a carrier time source 25, such as a cabled or wired site connection, some other network time source 21 such as an Internet website accessible over the network, or any other such source of real-time data 28 now known or later developed, which network time source 21 is in communication with the network modem 26, whether through a wired or wireless connection. As also shown, the wireless communication network 20 further generally includes a wireless router 27 that is also in communication with the network modem 26, again whether wired or wirelessly, whereby interactions over the Internet or other such network from the host network operations center 60, existing outside of the wireless communication network 20, with the network modem 26 are then transmitted over the network 20 by way of the wireless router 27 to one or more control units 30 as described herein. While a modem 26 and separate router 27 are shown and described, it will be appreciated that any such devices in any functional arrangement, whether as a single unit or as a separate modem and router with antenna and whether now known or later developed, may be employed within the network 20. As such, it will again be appreciated that the real-time data 28 available from the network service provider's time source 21 may be accessed through the network 20 in effectively the same way that other data is transmitted to each controller unit 30 to then be stored and utilized by the control unit 30 as herein described, it once more making no real difference whether the network is ReFLEX, cellular, WiFi, or any other such network—the fundamental principles of the present invention again remain unchanged. Accordingly, those skilled in the art will once more appreciate that the present invention is not limited to the particular network employed and thus any particular protocol in effect and any related data formatting and bundling scheme, but instead is again generally directed in one aspect to a means of providing real-time data to a wireless control unit 30 without having to equip such control unit 30 with its own means of acquiring real-time data, such as being cabled to a local cell site or tower or having an on-board GPS receiver. Once again, as also shown in FIG. 2B, a number of computer or computing type devices now known or later developed may be employed to interact over the Internet or the like with the host network operations center 60, which is again effectively a user interface, and thus with the one or more wireless controllers 30 for the purpose, among others, of checking the status of or remotely controlling one or more electrical apparatuses 200 connected to the one or more control units 30, such further devices including but not limited to cellular phones or smart phones and tablet devices.

Turning to FIG. 3, no matter the wireless network type—whether a pager network as shown in FIG. 1 or a more generic network such as cellular or the like as shown in FIG. 2A or WiFi or the like as shown in FIG. 2B—the processor/transceiver control unit 30 will effectively remain the same as is shown schematically as generally including a microprocessor 34, a transceiver 32, and a clock circuit 40. While the clock circuit 40 is shown as being separate from the microprocessor 34, it will be appreciated that it may also be imbedded within the microprocessor 34; moreover, any such location of the clock circuit 40 integral with or physically separated from the processor/transceiver control unit 30 so long as electrically connected to or in communication with the microprocessor 34 is possible without departing from the spirit and scope of the invention, as is true for a number of the other components illustrated in FIG. 3 as being integral with the processor/transceiver control unit 30 or even housed within the enclosure 50, more about which is said below, such as the power supply 46, the voltage transformer and regulation circuit 48, the RF transceiver 32, and even the relays 42 and associated current transformers 44, such that those skilled in the art will appreciate that the illustrated packaging of the electrical components as shown in FIG. 3 is merely exemplary of features and aspects of the present invention and expressly non-limiting. The microprocessor 34 may be virtually any such device now known or later developed in the art capable of storing and executing operating programs and data and interfacing with other electrical devices and components wired thereto, whether internal or external. As such, the microprocessor 34 is preferably configured with a permanent "read only memory" ("ROM") device 36 and a temporary random access memory ("RAM") device 38, though as with the clock circuit 40, it is possible that these memory devices 36, 38 could be separate devices from the microprocessor 34 within the control unit 30's circuitry or be any other kind of memory or data storage device now known or later developed. The permanent memory device 36 generally stores all of the internal programming of the microprocessor 34 that govern its operation (i.e., firmware), while the temporary memory 38 stores such data as the operating protocol 90, as explained in more detail below. The control unit 30 further includes one or more channels, or relays 42, each having a current transformer 44. The operation of the relays 42 and current transformers 44 in providing and monitoring electrical power, or voltage, to the connected electrical apparatuses 200 under the control of the microprocessor 34 is also described in detail below. The power typically required to operate the processor/transceiver control unit 30 of the present invention is approximately 20 volts in the exemplary embodiment. It is desirable that each control unit 30 be powered by the same circuit, or external power source 58, that is providing power to the electrical apparatuses 200 themselves so that a separate power supply for each control unit 30 is not necessary, except in the limited case of a back-up power supply 46, described below. However, most electrical apparatuses 200 to be controlled by the control unit 30 operate on at least the typical 120 volts, while larger apparatuses and systems, such as commercial outdoor lighting systems, can operate on up to 480 volts. As such, the control unit 30 may also be equipped with a voltage transformer 48 as necessary to convert the line voltage of the electrical apparatuses 200 as provided by the power source 58 to the 20 volts needed to power the control unit 30 in the exemplary embodiment. Typically, control units according to the present invention may be configured with the necessary transformer to step down voltages of 480, 347, 277, 240, 208 or 120 volts, though other such transformers are possible without departing from the spirit and scope of the present invention. More specifically, in the exemplary embodiment, the measurement between current and voltage based on resistance values is automatically calibrated under the control of the firmware residing in the microprocessor 34, such that one meter can control and monitor on multiple voltage levels. In the event of a loss of electrical power to the control unit 30, the unit's back-up power supply 46 is to at least have enough stored power to back-up the runtime and threshold nominal voltage and energy data and shut down properly. In an exemplary embodiment this may be accomplished through a high capacitance capacitor that can provide full power to the unit 30, and particularly the microprocessor 34, for up to approximately ten seconds after a complete power outage, providing ample time for the microprocessor 34 to "flash" the temporary memory device 38 with runtime data and other such information and then shut down. The back-up power supply 46 may further be capable of continuing to power the control unit 30, and particularly the clock circuit 40, for a finite time, such as one week, so as to maintain current date and time and enable the unit 30 to control the electrical apparatus 200 according to its stored operating protocol 90 as a default. This may be achieved through an on-board battery or other such device. Such a back-up power supply 46 may not be able to provide sufficient power to send and receive messages, though. However, it will be appreciated that the back-up power supply 46 may take on numerous other forms, both now known and later developed in the art, to support further operation of the control unit 30 even when external power is lost. When electrical power is restored, the control unit 30 will again synchronize its on-board time as kept by the clock circuit 40 with real-time as provided by the wireless network 20 (FIGS. 1 and 2A and 2B) and will send a "power on" acknowledgement message to the host network operations center 60 (FIGS. 1 and 2A and 2B). The back-up power supply 46 will also be recharged by the now restored AC line voltage. The programming of the control unit 30, again, is stored in a permanent memory device 36 within the microprocessor 34 and the temporary memory device 38 to which the other transient information is "flashed" is preferably nonvolatile so that neither are affected by power outages, whether or not a back-up power supply 46 is in place. A UL and NEMA 4× rated electrical enclosure 50 may be configured to house the processor/transceiver control unit 30 circuitry, though such circuitry may also be housed in an appropriate case, cabinet, box or other such enclosure that is on site, such as that of the breaker box or the electrical apparatus 200 being controlled and monitored. In the exemplary embodiment, the enclosure 50 is a roughly 3"×3"×9" water-tight plastic body and is, in any configuration, preferably configured so as to be conveniently installed on virtually any surface in the vicinity of the electrical apparatuses 200 to be controlled or to the exterior or within the interior of a specific electrical apparatus 200 with which the control unit 30 is associated. Accordingly, the wires 52 through which the control unit 30 is to be connected to the line voltage supplying the electrical apparatuses 200 and to the apparatuses themselves may exit from an end of the enclosure 50 and/or the back and may in either case be approximately 3' in length, though it is to be appreciated that these locations and lengths are merely exemplary. The transceiver 32's antenna 54 may be directly installed within or to the control unit 30's enclosure 50, or the antenna 54 may be separately installed and be connected to the control unit 30 through an antenna cable, which would typically be on the order of 20' in length, though virtually any length is possible. A visible indicator 56, in the exemplary embodiment comprising one or more LEDs, may be configured on the outside of the control unit 30's enclosure 50 so as to indicate on location such status conditions of the control unit 30 as when power is supplied to the unit 30, when the transceiver 32 is active (perhaps even separately as a "transmitter active" LED and a "receiver active" LED), and when any of the relays 42 are active, are experiencing an over- or saturated-voltage condition, or have been overridden. This visible indicator 56 can take numerous forms, both now known and later developed in the art, and may also provide information beyond the exemplary power and network connection status. In addition to the above-described circuit elements and features, the control unit 30 may also be configured with a manual power switch (not shown), a voltage calibration adjustment (not shown) on each relay 42, a data interface port (not shown), such as an RS-232 port, and/or a keypad, touch screen, or other such user interface (not shown). It will be appreciated by those skilled in the art that numerous other physical and electrical configurations of the processor/transceiver control unit 30 of the present invention may be employed without departing from its spirit and scope. By way of further example, in an alternative exemplary embodiment, the control unit 30 may be configured for controlled on-site access as through an "iButton" or other such serialized component security- or pin-based log on for local control of the device settings. Such access can be to the entire control unit 30 firmware or to only the same user-defined variables as would be accessed and manipulated through a web portal, more about which is said below, whether on all channels or on a per channel basis. In a bit more detail, an "iButton" or other such device provides an electronic registration number to enable a secure method of authentication in place of an external switch that anyone on-site could operate. In this embodiment, a list of permitted iButton serial numbers are uploaded to the device to provide restricted access to on-site events. When the iButton is read, the serial number will be compared to the access list and only permitted serial numbers will be granted permission to the iButton functionality. The iButton can also operate independent of events and be used simply as a site-visit logger. In this mode, the serial number is reported by the device OTA (over-the-air) along with a time stamp. This does not require the serial number to be uploaded to the access list. Only when the iButton will also act as a switch will the access list be consulted. Once more, those skilled in the art will appreciate that other remote and on-site secure access technologies now known or later developed may be employed in the present invention without departing from its spirit and scope.

Figure 4A:
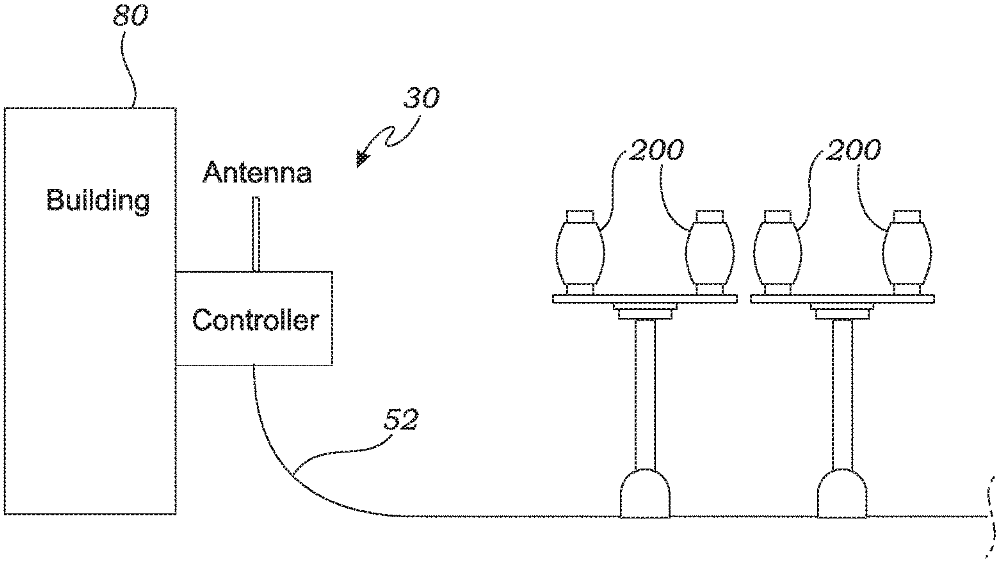
FIGS. 4A and 4B are schematics of alternative exemplary embodiments thereof.
Figure 4B:
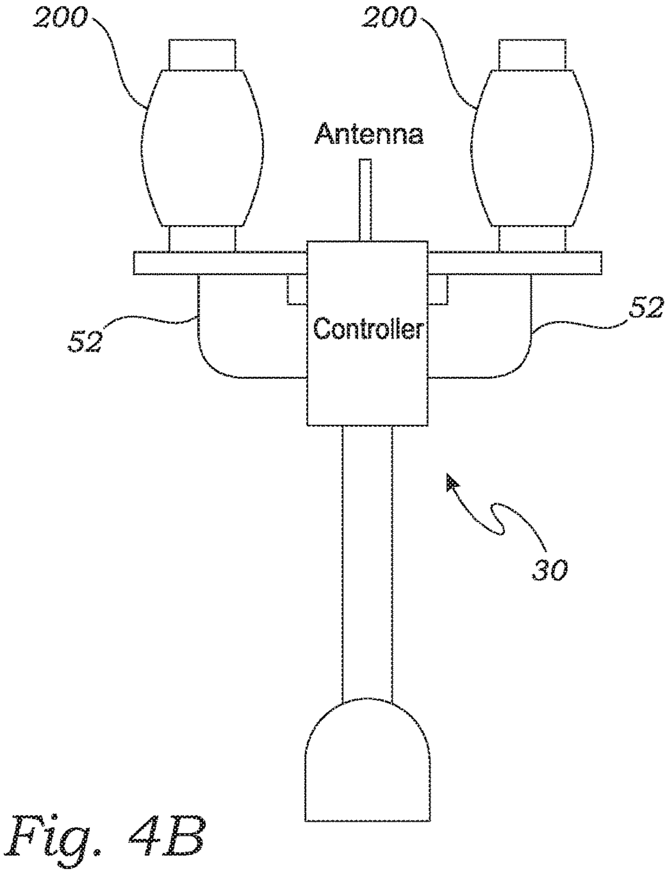

Referring now to FIGS. 4A and 4B, the first exemplary processor/transceiver control unit 30 is shown as being connected to one or more electrical apparatuses 200. Specifically, as illustrated in the exemplary embodiments, a single control unit 30 may be connected to a single electrical apparatus 200 or multiple apparatuses 200. When multiple apparatuses 200 are to be controlled and monitored, the apparatuses 200 may be connected in series so as to all be controlled in the same way according to a single operating protocol 90. Accordingly, in the exemplary embodiment of FIG. 4A involving multiple light pole electrical apparatuses 200, the processor/transceiver control unit 30 may be installed at some on-site location, such as on a building 80, so as to be in series between a group of lights 200 and their power source 58 (FIG. 3). In this way, as explained in more detail below, a single operating protocol 90 stored within the processor/transceiver control unit 30 can be used to control multiple light pole electrical apparatuses 200. Or, multiple apparatuses 200 may be independently controlled by a single processor/transceiver control unit 30 by each being connected to separate channels, or relays 42, of the control unit 30, as shown in the alternative embodiment of FIG. 4B. In the alternative exemplary embodiment, then, the control unit 30 is configured with two channels 42, each being wired to a separate bulb or ballast defining the respective light pole electrical apparatus 200 and each potentially being assigned a different operating protocol 90 stored in the control unit 30's memory 38 (FIG. 3). In this way, one bulb or ballast can operate according to one protocol and one according to another. It will be appreciated by those skilled in the art that a single processor/transceiver control unit 30 can be configured with virtually any number of channels 42, and so control a number of different electrical apparatuses 200 separately, and that the two channels shown and described are merely exemplary.

Figure 5:
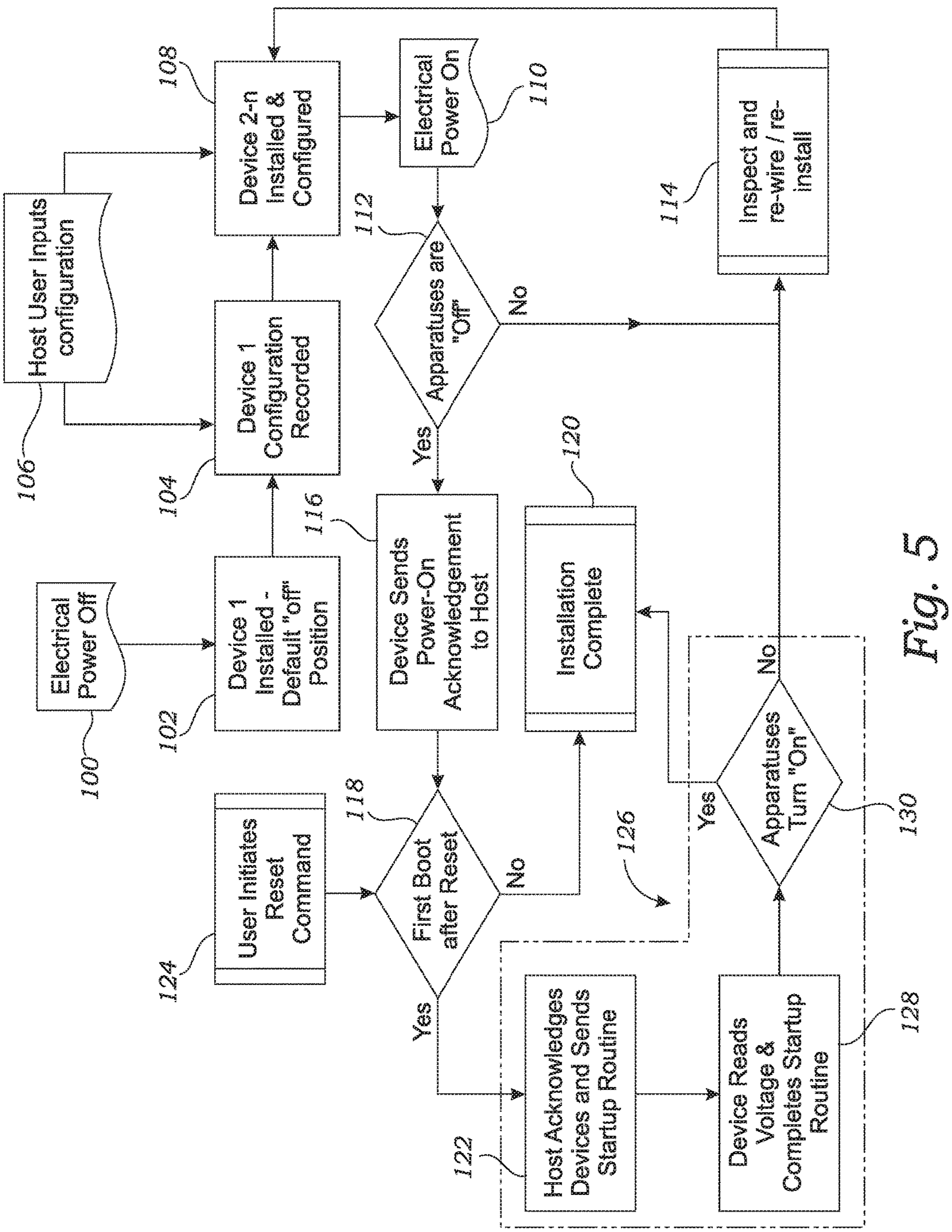
FIG. 5 is a flow chart depicting the installation and initialization of an exemplary embodiment thereof.

The processor/transceiver control unit 30 is installed and connected to one or more electrical apparatuses 200 and then powered up and initialized as shown in FIG. 5. At step 100 the power source 58 (FIG. 3) feeding the electrical apparatus(es) 200 to be controlled is initially switched off In step 102, a first control unit 30 is then wired between the power source 58 and the electrical apparatuses 200, as described above (see FIGS. 3, 4A and 4B). When first installed, the control unit 30 is in a default "off" position. At step 104, the configuration of the control unit 30 is recorded, which includes, as indicated at step 106, user input through the host network operations center 60 (FIGS. 1 and 2) of such information for each control unit 30 as its identification, geographical location, relay settings, and number of electrical apparatuses connected, more about which will be said below. This same process of installing and configuring a control unit 30 can then be repeated for numerous such units, as indicated at step 108. In step 110, the power source 58 feeding the electrical apparatus(es) 200 now connected to one or more control units 30 is switched on. Because the control units 30 are installed in a default "off" condition, if the installation has been successful and the units 30 are operating to control their respective electrical apparatuses 200, the apparatuses 200 should remain "off" even though their power source 58 is now "on," as indicated at step 112. If the electrical apparatuses 200 are "on" rather than "off," the installation of the control unit(s) 30 should be inspected and corrected as necessary, as indicated at step 114. If the electrical apparatuses 200 do remain "off" so as to indicate that the control units 30 have been installed and are operating correctly, in step 116 each control unit 30 would then automatically send a power-on acknowledgement message to the network operations center 60 over the wireless network 20 (FIGS. 1 and 2). At step 118, if this "power-on" condition is not the first "boot up" after an installation or reset, then the power-up is essentially complete, as indicated at step 120. However, if the "power-on" condition is the first "boot up," as it would always be after an installation, the network operations center 60 replies to the power-on acknowledgement message sent at step 116 with a startup routine or "Operate Initialization Routine" command, as indicated at step 122. It will be appreciated that a first "boot up" and, hence, the startup routine can also be initiated by a user reset command, as in step 124. Beyond a command to the control units 30 to begin the initialization routine 126, the user may also at step 124 selectively set the parameters for the initialization routine. That is, the control unit 30 runs an initialization routine 126 that is configured by the user through the host network operations center 60 (FIGS. 1 and 2) and executed upon transmission of the initialization or "boot-up" command from the host. Generally, the initialization routine 126 includes at least one on/off cycle, as in step 130, and a voltage reading to determine the nominal voltage, as in step 128, explained below. A second on/off cycle can follow the voltage reading 128, if so configured by the user. Variables for the initialization routine 126 that can also be elected by the user include the duration of the on/off cycles and the time between cycles. In the case of the exemplary embodiment in which light poles are controlled, it is preferable that the duration of the on/off cycle be sufficient to allow the light bulbs to be fully energized before the threshold nominal voltage is measured, as described below. At the completion of the required number of on/off cycles and the voltage reading, if the electrical apparatuses 200 are properly powered and functioning, as indicated by the nominal voltage reading, the control unit 30 will send an initialization confirmation message and the installation will be complete, as in step 120. Again, if one or more of the electrical apparatuses 200 are not properly powered or functioning or the initialization routine 126 is otherwise not successfully completed, an initialization status message so indicating and, when needed, a low-, saturation-, or off-voltage alarm message will be sent from the control unit 30 to the network operations center 60 to trigger the appropriate corrective action, such as inspection and reinstallation as in step 114. Regarding the voltage reading at step 128, as set forth above, each control channel or relay 42 of the processor/transceiver control unit 30 has a current transformer ("CT") 44 (FIG. 3) for monitoring circuit amperage. During the initialization routine 126, then, the control unit 30 will calculate a threshold nominal voltage value based on the electrical apparatus(es) 200 assigned and connected to each relay 42. The number of apparatuses 200 per control unit 30 and/or relay 42 is, again, set by the user at step 106. Actual operating CT voltage is monitored only when that channel's relay 42 is "on" and only after the initialization routine 126 is completed. More specifically, in the exemplary embodiment, the current transformer 44 senses the control circuit load current and creates a proportional voltage output to the load current (i.e. 20A=1.25V). This voltage is then read by the A/D converter on board the microprocessor 34 to establish an "on state" circuit current (Ampere) value. This value is then used for determining the healthy state of the control circuit current and enabling the control unit 30 to report an exception alarm when this value exceeded the determined threshold value. In one embodiment, all such current or voltage monitoring is internal to the control unit 30, except when a low-voltage condition is detected and reported or when an on-demand status request is initiated by a user through the host network operations center 60. Regarding a detected low-voltage condition, which would indicate that one or more of the electrical apparatuses 200, such as a bulb, has failed or is otherwise not functioning properly, the alert voltage change ($\Delta V_a$) is determined by dividing the nominal voltage ($V_n$) determined during installation by the number of electrical apparatuses (n), assuming each apparatus draws the same power.

$$\Delta V_a = (V_n/n)$$

For example, if the electrical apparatus 200 being controlled is a light pole having four bulbs per ballast or relay and a threshold nominal voltage of 2.0 volts, the alert voltage change would be 0.5 volts. Accordingly, when an operating CT voltage of 1.5 volts is detected on the control channel by the current transformer, a low-voltage alert would be warranted, specifically indicating that one of the four bulbs is out or malfunctioning. Continuing the example, it would follow that if an actual CT voltage of 1.0 volt were detected, that would indicate that two of the four bulbs were out or malfunctioning, and so on. Again, it will be appreciated by those skilled in the art that a similar approach using voltage changes may be employed in monitoring and reporting on the operation of a variety of electrical apparatuses being controlled and, as such, that the monitoring and reporting of bulb outages is merely exemplary. Once a low-voltage condition is detected, a voltage alert signal is sent to the network operation center 60 for corrective action, as described more fully below.

Figure 6:
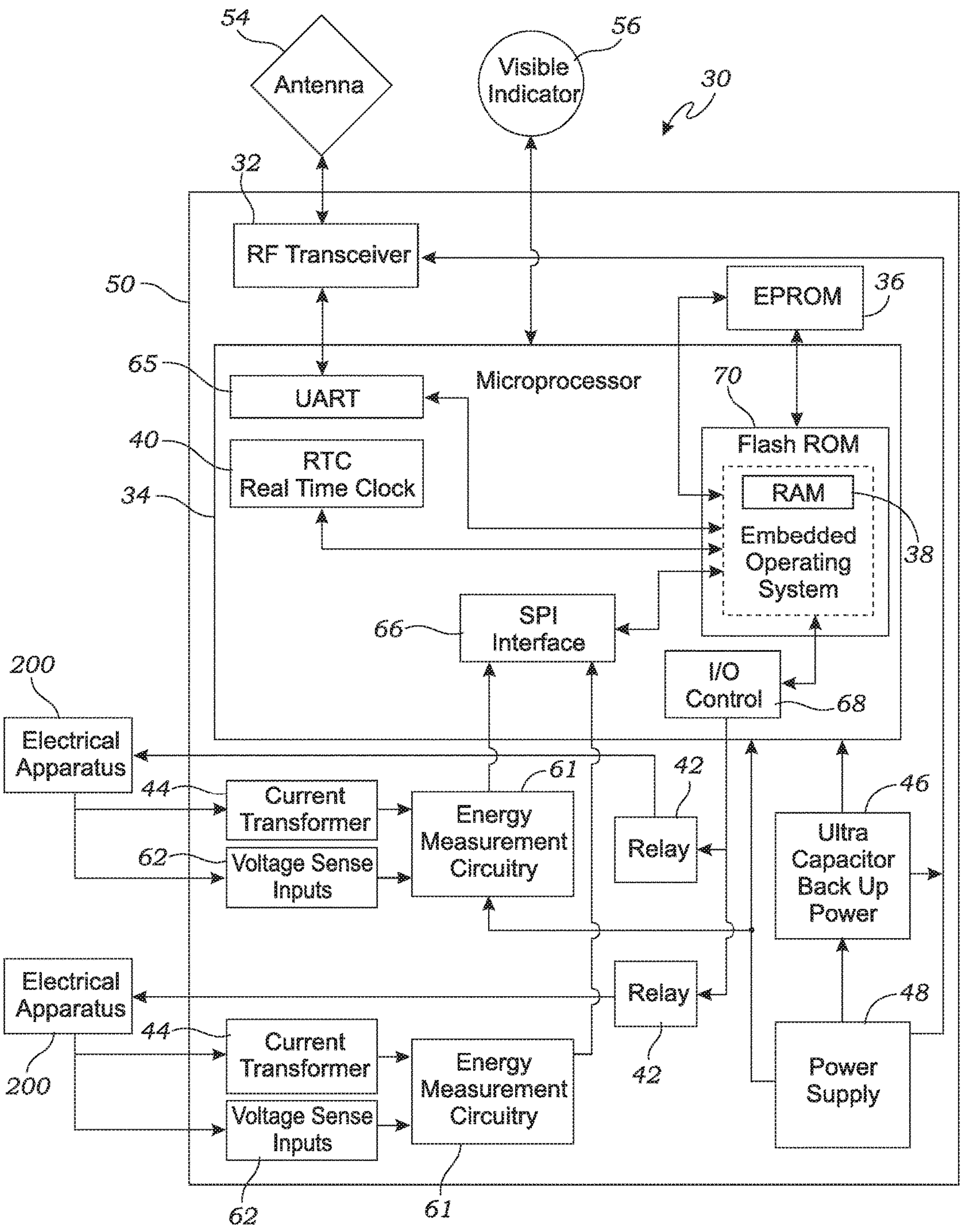
FIG. 6 is a schematic of a first alternative exemplary control unit thereof.

With reference now to FIG. 6, in an alternative embodiment, rather than measuring and reporting nominal voltage and change in voltage as a means of monitoring and even detecting failures in one or more electrical apparatuses 200 connected to and being controlled by a particular control unit 30 according to aspects of the present invention, the current transformers 44 that effectively function as energy monitors on each of the respective channels or relays 42 may be configured instead to interface with the microprocessor 34 by way of a "SAMES" integrated circuit ("IC") or energy measurement circuitry 61 so as to convert CT voltage to actual units of energy (Watts). More particularly, in the alternative embodiment, voltage sense inputs 62 in parallel with the current transformer 44 on each channel cooperate with the current transformer 44 to give the energy measurement circuitry 61 voltage and current data from which to calculate energy (i.e., V(AC)×i(AMP)=Watts). The energy measurement circuitry 61 is in the exemplary embodiment actually a separate processor (ASIC) that takes the current data output from the current transformer 44 and the actual control circuit voltage(s) from the voltage sense inputs 62 to precisely calculate the energy values. By looking at true energy draw (Watts) and consumption (totalization, in kW·hr) and not just voltage or current, more precise monitoring of an electrical apparatus 200 is enabled, such that early detection of problems and failure prediction is possible, based, for example, on increased energy consumption on the same channel or relay 42. Accordingly, rather than an all-or-nothing step-down as with voltage monitoring indicating, as above, that a bulb or ballast is out, for example, instead, with energy monitoring as enabled by the incorporation of a "SAMES" or other such integrated circuit on each channel, slight variations in energy consumption, as indicating additional resistance on a line or increased friction on a pump shaft as when a bearing is beginning to go, can be detected and reported. Based on the firmware installed in the microprocessor 34 or user selected threshold values, increased energy consumption, for example, of five percent (5%) on a particular channel or relay 42 may be reported for corrective action. In part, such corrective action may include inspection and, as necessary, repair or replacement of the affected electrical apparatus 200 being monitored and controlled, or power to the electrical apparatus 200 may simply be cut or reduced to minimize the effect on operation of the electrical apparatus 200 and the rest of the system being controlled. The advantage of using the SAMES IC or other such energy measurement circuitry 61 as described herein in connection with the alternative exemplary embodiment of FIG. 6 is that this allows the device 30 to achieve very accurate measurements of both single-phase and three-phase energy, though the illustrated device 30 per the electrical schematic of FIG. 6 is configured for controlling two-wire, single-phase circuits, with two additional relays per channel being one means by which three-phase circuits would be monitored and controlled. By comparison, in the embodiment of FIG. 3, the device is configured to essentially only see current fluctuations on single phase circuits and then report upon exception. Whereas the addition of the energy measurement circuitry 61 allows the embedded software to look at the total control circuit's energy health (i.e., power factor, phase angle error, missing phase, over/under voltage conditions etc.). This again allows the device 30 to detect a wattage drop in the control circuit. For example, then, if there is a control circuit that has "mixed apparatus" loads—i.e., to illustrate in a lighting application, twenty 500 W bulbs, one 40 watt bulb and ten 100 W bulbs all on a 480 volt 3-phase circuit—the controller 30 is able to see any or all bulb failures including the one 40 W bulb, which again would not be possible if only looking at current rather than energy. In sum regarding the alternative exemplary embodiment, an electrical controller 30 according to aspects of the present invention has the ability to monitor two independent energy inputs provided by the SAMES energy and power measurement circuitry 61. These inputs are divided into two separate channels that are independently associated with relays 42, which relays 42 can be used to make and break an electrical connection that will power an external circuit relating to a controlled and monitored electrical apparatus 200 such as an electric motor, lighting, HVAC, or any type of electrical device that can be controlled using a switch. The energy used to power such an external device circuit can be directly monitored by using a current transformer (CT) and the input or line or apparatus voltage, from which energy (Watts) consumption can be calculated. If an energy value is determined to be out of bounds, based on configurable minimum/maximum thresholds, an alarm notification will be sent by the device 30. The alarm conditions may require an initial energy baseline be taken in order to set the alarm thresholds. In the exemplary embodiment, the type of energy load to be monitored is configurable per channel by switching on-board latching relays to modify such power and energy properties as the measurable $V_{RATED}$ and $I_{RATED}$ input to the SAMES IC.

Many energy parameters can be monitored for exceptions. Voltage and current can be monitored as a whole (e.g. mains voltage) or by phase as can the power factor (PF), a phase being synonymous with a physical line. For an alarm notification to be sent the alarm condition must be met for a set period of time, which is preferable to avoid sending multiple alarm notification messages for a border-line exception condition that may bounce in and out of alarm. The duration (or delay) provides a way for the user to customize the sensitivity of the alarm monitor. In addition to receiving an alarm notification, the alarm monitor can also be configured to deactivate the relay on alarm to protect the external circuit (i.e., the electrical apparatus 200), thus acting like a circuit breaker. If this operation of the control unit 30 is selected then an alarm must be cleared manually by the user. When the relay is deactivated the external circuit may no longer be powered, thus preventing the device from clearing the alarm autonomously. It should be noted that if such protection to the external circuit is to be achieved the sensitivity duration should be set to essentially zero (so the response to an alarm can be substantially immediately acted upon). Thus, the firmware will not employ the duration setting if circuit protection is enabled. Also, it is not necessary that the energy being monitored be from the circuit that is controlled by the relay contacts, as the relays 42 and SAMES IC 61 may be physically isolated from each other depending on how the control unit 30 is installed and configured. In a specific embodiment, a SAMES SA9904B IC is employed, which features bidirectional active and reactive energy and power measurement per phase and the ability to monitor single phase or three-phase power. In order for the firmware to correctly monitor energy, the type of power must be specified as part of the initial set-up of the device 30. In addition, the RMS voltage and frequency is also measurable per phase. Energy measurement can be limited to the energy used during relay controlled events or it can be the total energy for the system regardless of the relay state. Those skilled in the art will again appreciate that while two channels or relays 42 have been shown and described along with other details concerning the SAMES IC 61 as part of the circuit so as to receive and act on data from both the current transformers 44 and the voltage sense inputs 62, a variety of other electrical components and number thereof may be incorporated in a controller 30 according to aspects of the present invention without departing from its spirit and scope. For example, with continued reference to FIG. 5, the microprocessor 34 is shown as further including a UART (Universal Asynchronous Receiver/Transmitter) 65, which is a microchip with programming that controls a computer's interface to its attached serial devices such as an RS-232C Data Terminal Equipment (DTE) interface so that it can "talk to" and exchange data with modems and other serial devices; specifically, here, the UART 65 is in series between the RAM 38 (firmware) and the RF Transceiver 32, the UART 65 handling the TTL serial protocol in order to communicate with the RF module. Additionally, the microprocessor 34 is also shown as now having the clock circuit 40 on board, as well as an SPI (Serial Peripheral Interface) 66 used to enable connectivity and communication between the SAMES IC's 61 and the RAM 38 (firmware) (its output energy values (KW/second) are then read into the firmware and processed accordingly) and an I/O (input/output) control 68 in series between the relays 42 and the RAM 38. There is also shown an on-board Flash ROM 70 incorporating the RAM storage 38 onto which the embedded operating system is flashed, while an external EPROM 36 is now employed for storing the device configuration and runtime information in the event of a software update/reprogramming of the device 30.

Ultimately, in the alternative exemplary embodiment of FIG. 6, an NXP 2138 SoC (System on Chip) type microprocessor having 512 Kb of onboard Flash ROM (code space) and 32 Kb of RAM is employed having the features such as the SPI shown and described as part of an "on chip peripheral stack" and not as a separate integrated circuit, though once more those skilled in the art will appreciate that any processor and other electrical components and configurations thereof now known or later developed capable of performing as described herein may be employed without departing from the spirit and scope of the invention. It is further noted that an on-board power supply 48 is shown in FIG. 6 as being substantially analogous to the voltage transformer and regulation circuits 48 of the embodiment of FIG. 3, while the external power source 58 (FIG. 3) is not shown in FIG. 6 for simplicity. It will be further appreciated that while such a control unit 30 as shown and described in connection with FIG. 6 is thus able to monitor and report on the health of an external or downstream circuit (i.e., the operation of a controlled electrical apparatus 200), the unit 30 so configured to monitor actual energy and sense fluctuations and anomalies can thus effectively monitor upstream energy quality, or the quality of power being supplied from the grid. As such, the control unit 30 and its data gathering and reporting provides for quality control and an audit trail relating to both supplied and consumed energy while further enabling responsive control of a remote electrical apparatus 200 at least in part based on such energy data. Moreover, it will be appreciated that such a controller 30 in combination with energy monitoring functionality (or a combination controller and wireless energy or Watt meter) has a number of further advantages in use, including the ability to pre-pay for and/or receive a finite, measured amount of energy and then shut off the controlled device(s) 200 after that amount of energy has been consumed. For example, the controller 30 and accompanying software/website as accessed over the Internet 62 through the host network operations center 60 (FIGS. 1 and 2A and 2B) could allow users to set a maximum amount of energy to be consumed in a given period of time, say on a monthly basis, for example. The controller/software could then do a number of things, such as: (1) shut off power once that maximum monthly energy amount has been reached; (2) calculate and ration out a daily amount of energy, and shut off power daily if that daily energy amount has been reached (thus preventing the user from burning through all of their energy in the first few days of the month); (3) provide visual updates on the current amount of energy use and how much is remaining in that given month, day, etc.; and (4) automatically, or allow the user to manually, categorize and prioritize electrical components such that less important components are automatically shut off to conserve the rationed amount of energy for relatively more important devices. As such, the combination control and monitoring functionality of the controller 30 according to aspects of the present invention enables energy usage management, so as to stay within quotas and use energy more efficiently, as by not only controlled apparatuses that have not failed or have predictive failure, but also by planned use of such apparatuses, such as during non-peak hours.

Figure 7:
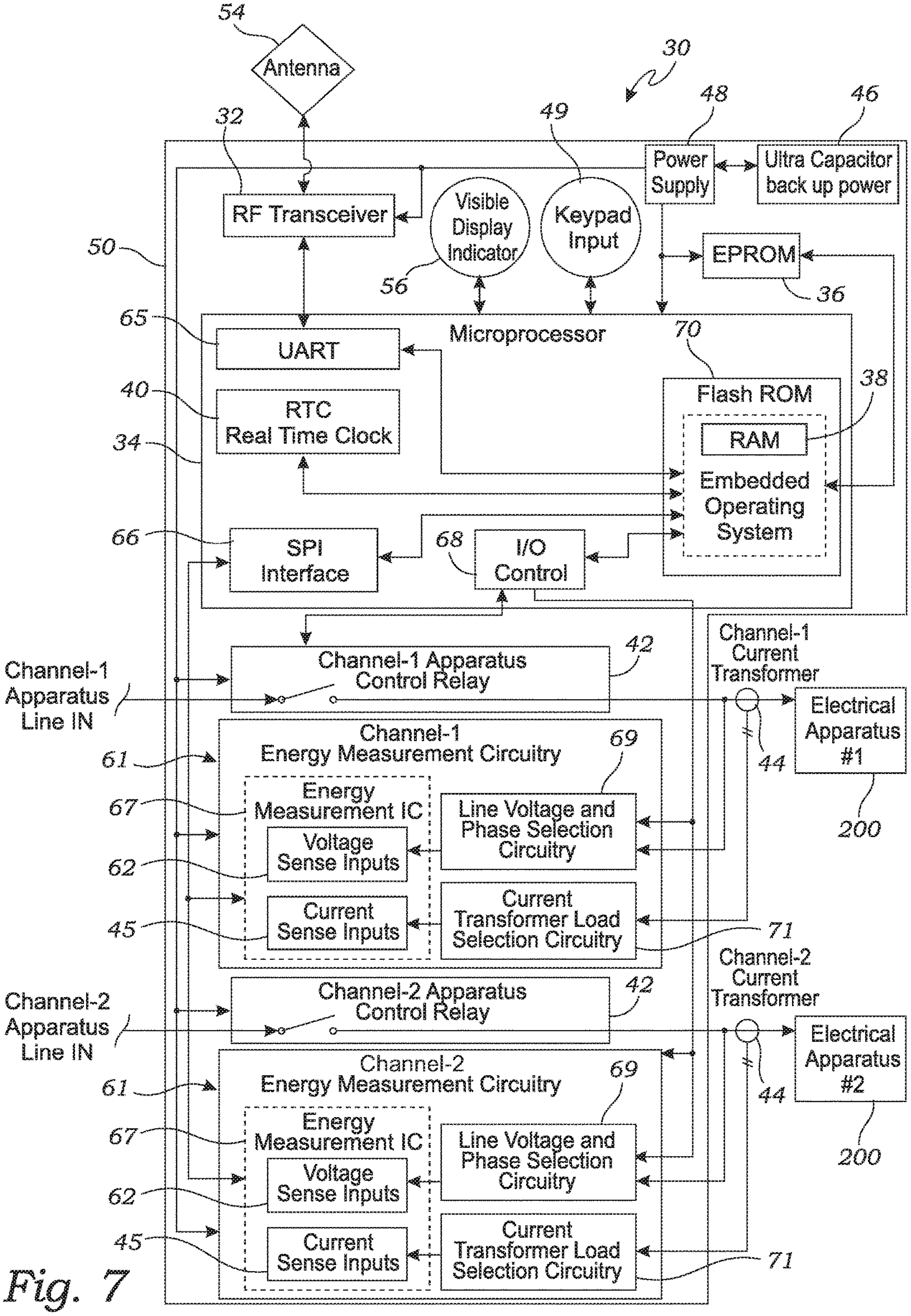
FIG. 7 is a schematic of a second alternative exemplary control unit thereof.

By way of further illustration, analogous to FIG. 6, there is shown in FIG. 7 a further exemplary schematic of a combination controller and energy meter device 30 according to aspects of the present invention. Particularly, in this alternative embodiment the voltage sense input 62 and now a current sense input 45 are shown as being a part of the energy management circuitry 61 on each channel, specifically collectively as the energy measurement integrated circuit (IC) 67 for each channel. The current transformer 44 for each channel is again shown as being a separate current sensor from the energy measurement circuitry 61 in line between the relay 42 and the respective electrical apparatus 200. Also within the energy measurement circuitry 61 for each channel are line voltage and phase selection circuitry 69 electrically connected between both the I/O control 68 and channel relay 42 and the voltage sense input 62 and current transformer load selection circuitry 71 in line between the channel current transformer 44 and the respective current sense input 45. All such components are again powered as needed by the power supply 48 and, as needed, the back-up power supply 46. When the controller 30 is in operation and the user configures the device to utilize the energy monitoring feature either locally, as through a keypad input 49 shown as connected to the microprocessor 34, which though not shown in FIG. 3 or 6 is in some form a feature of such other alternative embodiments as well and may take any form of a user interface now known or later developed, or wirelessly through the network 20 the device then allows the energy measurement circuitry channels to utilize a current sensor(s) 45 and the control line voltage sense input(s) 62 to establish the electrical statistics and energy utilization of each control channel. The energy measurement circuitry 61 uses the current sensor 45 and control line voltage sense input 62 to calculate the control circuit load (Amps), power factor and phase information, and energy consumption in Watts. The energy measurement circuitry can accurately measure single phase 120V, 208V, 220V, 277V and 3-phase 480V electrical loads. This energy information is then stored on the device for each individual control channel. These capabilities include the ability to monitor two independent energy inputs provided by the SAMES energy and power metering IC 61. These inputs are divided into two separate channels which are independently associated with relays 42. These relays 42 can be used to make and break an electrical connection that will power an external circuit such as an electric motor, lighting, HVAC or any type of device that can be controlled using a switch. The energy used to power this circuit can be directly monitored by using a current transformer (CT) and the input voltage. It is not necessary that the energy being monitored be from the circuit that is controlled by the relay contacts. The relays 42 and SAMES IC 61 are physically isolated from each other and are dependent upon how the device is installed and configured. In the exemplary embodiment, the REM controller 30 platform incorporates the SAMES SA9904B IC, which features bidirectional active and reactive energy and power measurement per phase. In addition, the RMS voltage and frequency is also measurable per phase. Once more, those skilled in the art will appreciate that a variety of other electronic components and configurations now know or later developed may be employed in the present invention without departing from its spirit and scope.

Turning again to FIG. 5, regarding user input of information relating to the geographical location of a particular control unit 30, as in step 106, inherently, the geographical location of each unit 30 falls within a specific time zone. With this location and time zone pin-pointed, the control unit 30 can be configured to make the appropriate offset from the international Greenwich Mean Time ("GMT") real-time data 28 provided from the wireless network 20 (FIG. 1) so as to synchronize to local real-time. In the continental United States, for example, there are effectively five time zones: (1) eastern daylight savings time ("EDST"), four hours earlier than GMT; (2) eastern standard time ("EST") or central daylight savings time ("CDST"), five hours earlier than GMT; (3) central standard time ("CST") or mountain daylight savings time ("MDST"), six hours earlier than GMT; (4) mountain standard time ("MST") or pacific daylight savings time ("PDST"), seven hours earlier than GMT; and (5) pacific standard time ("PST"), eight hours earlier than GMT. Thus, with the control unit 30 powered up and initialized and ready for communication, the unit's time zone can be set through a host- or user-initiated command. Specifically, in the exemplary embodiment, a global positioning system ("GPS") satellite 24 transmits international standard time data 28 in Greenwich Mean Time ("GMT"), which in the exemplary embodiment of FIG. 1 is then acquired by a GPS transceiver 22 and transmitted to a ReFLEX transceiver 26 located at a local tower site. The ReFLEX transceiver 26 then encodes the real-time data 28 for ReFLEX-frame time-stamp transmission, which under the current protocol would be a 901 to 940 MHz ReFLEX two-way radio frequency signal with the embedded time stamp, such as in the first frame of a 16- or 32-frame data header. Ultimately, this GMT real-time data 28 is received by the remote processor/transceiver control unit 30 located at the electrical apparatus 200. Because the control unit 30 has been set-up and initialized, including accounting for its geographical location, and thus time zone, the unit is able to convert the GMT real-time data 28 imbedded in the ReFLEX transmission into local time, or system time, for that particular control unit 30. The date may also be embedded in the real-time data 28 signal and/or may be initially set by the user during unit installation at step 106. Again, while a two-way ReFLEX network 20 is shown and described in the exemplary embodiment of FIG. 1, it will be appreciated that any two-way wireless data transmission system now known or later developed in the art that includes imbedded real-time data inherent in the network provider's signal or that contains a network time source 21 from which real-time data can be obtained can be employed without departing from the spirit and scope of the present invention, such as the alternative exemplary embodiments of FIG. 2A representing cellular or the like and of FIG. 2B representing WiFi or the like or any other such wireless two-way network now known or later developed. Beyond configuring each unit 30's time zone remotely through a command sent from the host network operations center 60 according to the geographical location of the control unit 30 determined during installation, as explained more fully above, in the exemplary embodiment, the control unit 30 is further capable of accounting for sunrise and sunset in its particular location for more accurate and efficient control of its associated electrical apparatuses 200, particularly lights and lighting systems. Essentially, to determine the sunrise and sunset (dawn and dusk) times, the latitude and longitude of each control unit 30 is also defined. In the exemplary embodiment, these values are sent from the host 60 to each control unit 30 during setup and initialization. With the date and these values, the control unit 30 itself, through its microprocessor 34 and permanently stored programming, is able to calculate sunrise and sunset times and to control its associated electrical apparatus(es) 200 accordingly, depending on whether a dusk/dawn with cut-back or dusk/dawn with start time or end time schedule is stored in the control unit 30, as explained below. It will be appreciated by those skilled in the art that the latitude and longitude data and the corresponding sunrise and sunset calculations may be downloaded or made in a number of other ways without departing from the spirit and scope of the invention.

Figure 8:
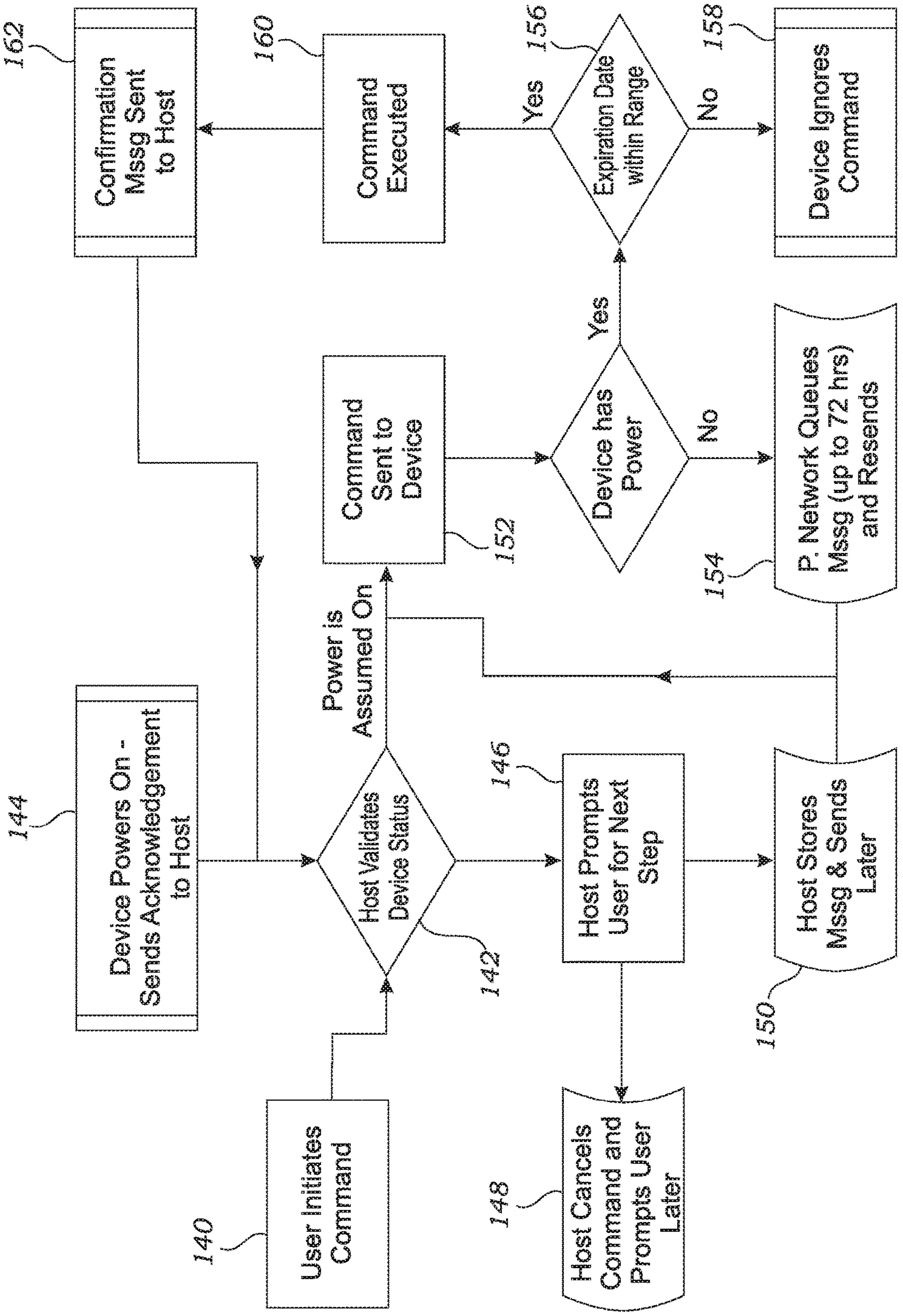
FIG. 8 is a flow chart depicting communications in an exemplary embodiment thereof.

Generally, with reference to FIGS. 1-8, in use an operating protocol 90 is stored in the microprocessor 34 or other memory location 38 of each processor/transceiver control unit 30 for each channel 42, either at the factory or through a wireless signal generated by the user interfacing with the system 10 over a secure Internet connection 62 to the host network operations center 60. The user may also indirectly initiate the storage of the operation protocol 90 by initially configuring the control unit 30 and/or the network operations center 60 such that operating instructions are sent to one or more control units 30 automatically. The host 60 is essentially a web-based server and corresponding software configured to process and cooperate with user commands in configuring the control units 30; i.e., an Internet or web portal with and through which any device with access to the Internet may interact with the appropriate log-in credentials. As explained in more detail below, each operating protocol 90 is essentially a permanent, or default, schedule or a temporary, or override, schedule. Turning further to FIG. 8, messages of any kind are communicated to the control unit 30 over the wireless network 20 at the initiation of a user through a terminal 64, as indicated in step 140, though, again, some messages may be sent automatically. At step 142, the host network operations center 60 then validates the unit 30's status before proceeding further, which would include insuring that the particular unit 30 to which the user's command is directed is powered up through the request for and receipt of a power on or "Boot Up" message from the unit 30, as in step 144. If power is not found to be on for the control unit 30 at issue or it is otherwise unresponsive or not functioning properly, the host 60 will prompt the user for a next command, as indicated at step 146, which would essentially be to cancel the command and prompt the user later when the unit 30 is responding and/or powered up, as in step 148, or store the command at the network operations center 60 and send it later when the unit 30 is responding and ready, as in step 150. In step 152, once the control unit 30 is found to be on and ready to receive transmissions, either initially or on a retry, or if such is assumed by the host 60, the command is at that time sent over the wireless network 20 to the control unit 30. If the control unit 30 does not have power or the command is otherwise not received by the unit 30, the command is stored and queued for retransmission, as indicated at step 154. When any such command message is sent from the host 60, in the exemplary embodiment, it will include a date/time stamp in the time zone of the control device 30 to which the message is being sent, which is effectively the expiration date/time for the message. Thus, where the control unit 30 in fact has power and successfully receives the command signal, in step 156, the expiration date/time of the signal is compared by the control unit 30 to real-time for that location as kept by its clock circuit 40. If the command is received after the expiration date/time stamp it is to be ignored by the control unit, as in step 158. On the other hand, if the command is received before the expiration date/time or there is no date/time stamp in the command message from the host 60, in which case the control unit 30 is to assume that the command has no expiration, the command is executed accordingly, as in step 160. At step 162, after any command is executed, a confirmation message is sent from the control unit 30 to the host network operations center 60, as explained in more detail below. Those skilled in the art will appreciate that the command message communication shown and described is merely exemplary and that numerous other command and message sequences can be employed without departing from the spirit and scope of the present invention.

Referring generally once more to FIGS. 1 and 2A and 2B, in controlling the electrical apparatuses 200 to which a particular processor/transceiver control unit 30 is connected, in the exemplary embodiment each unit 30 generally follows its stored operating protocol 90 (FIG. 3) according to a hierarchical approach. The default operating protocol 90 is any associated permanent schedule. Permanently scheduled events, or events which are recurring, are generally defined by their day of execution, start time, event number, relay state, and duration. In the exemplary embodiment, three events per day may be configured for each day of the week, or a total of twenty-one scheduled events per week. In other words, Monday can have a different permanent schedule than Tuesday, etc. Accordingly, portions of the permanent schedule may be updated or changed remotely without transmitting an entire schedule batch. As above, if electrical power to the control unit 30 is lost, the unit 30 will maintain its permanent schedule and run accordingly until power is restored and a different schedule is imposed, either as a temporary schedule or through an on-demand command. If a temporary schedule is then transmitted by the user through the host network operations center 60 to the control unit 30, the temporary schedule will be followed and will override the permanent schedule to the extent that the times in the respective schedules overlap. Temporary scheduled events are single or one-time events that are generally defined by a day of execution, start time, relay state, and duration. In the exemplary embodiment, twenty-one temporary scheduled events may be stored in the memory of the control unit, though it will be appreciated that any number of temporary events can be scheduled, as they are not limited by a weekly or daily interval, but may be scheduled at any time. Regarding the duration of a temporary scheduled event, if the duration is set to zero, the temporary event will run indefinitely until the inverse relay state is executed by a permanent schedule or an on-demand command sent by a user. Any other duration will cause the temporary event to run for that time period from the start time, at the end of which the control unit will return to its default state according to the permanent schedule. Thirdly, whether the control unit 30 is presently controlling its associated electrical apparatus(es) 200 according to a permanent or temporary schedule, if an on-demand command is transmitted from the host 60 having a start time that is the same as or later than real-time, the on-demand command will be executed at the appropriate time, thereby overriding any permanent or temporary schedule on which the control unit would otherwise be operating. Examples of on-demand commands that may be sent from the host network operations center 60 to a remote processor/transceiver control unit 30, again, either at the initiation of a user or automatically, include "On," "Off," "Record Voltage," and "Reset." Once the on-demand command is completed, the control unit 30 will revert back to whatever schedule, permanent or temporary, it was to be following at that time. Moreover, rather than actual times of day, the processor/transceiver control unit 30 can execute according to an operating protocol 90 that accounts for sunset and/or sunrise, or dusk/dawn, the calculations of which are explained above. Where the electrical apparatus 200 is a light pole that is to be turned on a certain number of minutes before dusk and/or turned off a certain number of minutes after dawn, for example, an operating protocol based on dusk/dawn with cut-back can be employed. As such, the dusk/dawn times corresponding to when the electrical apparatus 200 would be turned on and off may be adjusted by a fixed number of minutes, such as thirty minutes before dusk and thirty minutes after dawn.

Similarly, where electrical apparatus 200 is to be turned on at dusk or turned off at dawn but have a fixed end time or start time, respectively, an operating protocol based on dusk with end time or dawn with start time can be employed, for example. In this way, dusk or dawn can be one triggering event, but a fixed time can be the other. It will be appreciated that both the dusk/dawn with cut-back and dusk/dawn with start or end time operating protocols may be useful in connection with numerous electrical apparatuses beyond light poles and that, as such, the light poles shown and described are, again, merely exemplary. In one or more of the exemplary embodiments, the commands that may be sent to the processor/transceiver control unit 30, either automatically or as initiated by the user, include, but are not limited to, "Set Time Zone," "Operate Initialization Routine," "Set Warm Up Duration," "Set Alarm Voltages and Bias," "Set Default Device State," "Set Permanent Scheduled Events," "On Demand," "Channel Override," "Configure Dawn/Dusk Operation," "Configure Dawn/Dusk Operation with Start Time," "Configure Dawn/Dusk Operation with End Time," "Set Temporary Scheduled Event," "Delete Temporary Scheduled Event," "Clear Event Configuration," "Enable/Disable Voltage Alarm Monitor Message," "Acknowledge Alarm Message," "Clear Alarm Message," "Set Runtime Download Message," "Set Boot Message," "Reset to Default," "Status Request," "Voltage Reading Request," "Runtime Log Request," "Check-sum Request," "Event Configuration Request," "Alarm Voltage Request," "Event State Request," "Time Stamp Request," "Initialization Request," "Disable Alarm," "Energy Calibration," "Get Alarm Configuration," "Get Alarm Status," "Get Baseline," "Reset Circuit Protection," "Run Baseline Initialization," "Set Alarm Configuration," "Set Mains Power," and "Set Monitoring Mode."

As indicated previously and shown in FIGS. 1 and 2A and 2B, communications from the remote processor/transceiver control unit 30 are transmitted through a local ReFLEX, cellular or other wireless site transceiver 26 and a ReFLEX or other network operations center 27 or in the case of WiFi or other area network or the like through an associated network modem 26 and router 27 and then to the host network operations center 60 via the Internet 62. Users may also receive messages from and remotely program one or more of the remote processor/transceiver control units 30 through the same host network operations center 60 over the Internet 62, with signals corresponding to communications from a user to a particular processor/transceiver control unit 30 also being transmitted through the two-way ReFLEX, cellular, WiFi, or other network 20. Again, while a two-way ReFLEX network is shown and described in the exemplary embodiment of FIG. 1, it will again be appreciated with reference to FIGS. 2A and 2B that any two-way wireless data transmission system now known or later developed can be employed without departing from the spirit and scope of the present invention. Further, in the exemplary embodiment, the user views the control unit 30's configurations and activities and sends and receives communications regarding such through a terminal interface 64 operating over a global communication network 62, such workstation or terminal interface 64 including but not limited to a personal computer, a smart phone, a tablet, or any other such computing or computer-type device configured for accessing the Internet or the like now known or later developed. An example of such a portal through which control unit data is viewable is that based on a VT-102-compatible terminal emulator program, though, again, it will be appreciated that numerous software programs and configurations, both now known and later developed, for facilitating network data transmission may be employed in the present invention. Regarding the host 60's, and ultimately the user's, tracking the status and performance of the electrical apparatuses 200 being controlled by the wireless system 10 of the present invention, there are numerous status messages that may be sent by the control units 30, again, either automatically or at the user's specific initiation. First, as above, each processor/transceiver control unit 30 effectively sends a confirmation message whenever a command is received and its function performed, the initialization routine 126 described above not excepted, which automatically sends an initialization confirmation as part of its very function. Confirmations are generally sent only when commands or messages are communicated from the host network operations center 60 to the control unit 30, with the intent to confirm that the message was received and executed. Accordingly, each confirmation message preferably includes a command identifier. Whenever the processor/transceiver control unit 30 powers an associated electrical apparatus 200 or otherwise boots, a "power-on" or "boot up" message will be transmitted from the control unit 30 to the host network operations 60 center via the wireless network 20. This feature, which is part of the software code permanently stored in the control unit 30's microprocessor 34, may nonetheless be enabled or disabled remotely over the wireless network 20. The control unit 30 may also provide a status message on polling by the host 60, which would include the relay state (on or off), the actual voltage(s) measured by the current transformer(s) or actual or totalized energy consumption as calculated by the integrated circuit or other chip or processor based on voltage, the current relay runtime, and the date and time the status was requested. Relatedly, the control unit 30 stores daily runtime data that can be downloaded in batch form to the host 60 based on a user- or host-initiated command. Further, the control unit 30 may be configured to send runtime data to the host 60 once per day automatically. In one configuration, the control unit 30's daily runtime data, or heartbeat message, is set to include the total relay on-time for the 12-hour morning period and the 12-hour evening period of the 24-hour daily run cycle. Check-sum is a programming feature of the processor/transceiver control unit 30 that periodically verifies its scheduling information against that of the host 60, or the unit 30's event configuration against that entered by the user. The control unit 30 can be queried automatically by the host 60 or by a user command. In the exemplary embodiment, the check-sum used is a cyclic redundant code employing polynomial of width 8 ("CRC-8"). It will be appreciated by those skilled in the art that a variety of programming codes or steps may be employed in periodically verifying the control unit 30's scheduling data against that entered by the user and that the CRC-8 check-sum is merely exemplary. A reset command may be sent to the processor/transceiver control unit 30 so as to erase all configuration information and return the control unit 30 to its factory defaults. The reset feature is useful when the control unit 30 is reinstalled in another environment and must be reset so that the host network operations center 60 can initiate the initialization routine 126 described above. As above, the control unit 30 is also configured to send a voltage alert signal when a low-voltage, saturation-voltage, or off-voltage condition is detected or current or totalized energy data, which indicates that one or more electrical apparatuses being controlled has in some way malfunctioned or is beginning to, as explained above. The alert signal will generally include the type of alert and the date and time of the alert. Alerts are sent to the host network operations center 60 initially in real-time as they occur, and then every twenty-four hours until the control unit 30 receives a message from the host 60 confirming receipt of the alert. Even after receiving the confirmation message from the host 60, the control unit 30 stays in alert mode, without sending additional alerts, until an acknowledgement that the situation has been corrected is received, typically in the form of clear alert command initiated by the user over the Internet 62 through the host network operations center 60. While the above-described alert signal protocol is the exemplary default for the control units 30, each alert function can be wirelessly enabled or disabled for each control channel, or relay 42, through user commands. In addition to the voltage or energy consumption alert signals, the control unit 30 may be further programmed to similarly send other alert signals, such as a relay failure alert indicating that a control channel, or relay 42, itself has malfunctioned. Moreover, it will be appreciated by those skilled in the art that numerous other combinations and sequences of wireless alerts and response communications are possible without departing from the spirit and scope of the invention. In the exemplary embodiment, the messages that may be sent from the processor/transceiver control unit, either automatically or as initiated by the user, include, but are not limited to, "Boot Up," "Initialization Complete," "Low Voltage Alarm," "Saturation Voltage Alarm," "Off Voltage Alarm," "Channel Voltage Reading," "Device Status Reading," "Daily Runtime Download," "Runtime Log," "Check-sum Response," "Event Configuration Response," "Stored Alarm Voltages," "Event State Download," "Time Stamp Download," "Initialization Status Download," and "Command Confirmation."

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventors believe that the claimed subject matter is the invention.

What is claimed is:

1. A device for controlling one or more electrical apparatuses comprising a processor/transceiver control unit connected to each electrical apparatus, the processor/transceiver control unit comprising:

a microprocessor wired to an RF transceiver, the microprocessor storing operating protocol commands as sent over a wireless network having a network time source, the RF transceiver and microprocessor being configured in cooperation with software code residing in the microprocessor to receive real-time data as sourced from the network time source and transmitted over the wireless network, the operating protocol commands being selected from the group consisting of an on demand command sent from a network operations center over the wireless network, a temporary schedule stored in the microprocessor for the days and times not overridden by an on demand command, a permanent schedule stored in the microprocessor for the days and times not overridden by an on demand command or a temporary schedule, and a get time command for selectively acquiring the real-time data from the network time source, the microprocessor storing a time zone and a latitude and longitude coordinate of the device and on that basis determining dusk/dawn time offsets for the device in cooperation with the software code; and a clock circuit connected to the microprocessor and configured for storing the real-time data, the real-time data being adjusted by the microprocessor as needed according to the time zone of the device and the sunrise and sunset time for the device as calculated by the microprocessor, whereby the device controls power to the one or more electrical apparatuses according to the operating protocol commands at real-time as kept by the clock circuit with such real-time data being acquired by the device from the wireless network by which the operating protocol commands are sent and being adjusted as needed based on the time zone and latitude and longitude of the device, thus eliminating the need for a separate GPS receiver in the device for receiving real-time data and optimally controlling the one or more electrical apparatuses relative to dusk/dawn offsets.

2. The device of claim 1 wherein the real-time data comprises native time as stored in the network time source and transmitted within a header of a network carrier signal over the wireless network.

3. The device of claim 2 wherein the native time is sourced from a global positioning system satellite and the network time source is a GPS receiver.

4. The device of claim 2 wherein the native time is sourced from a carrier time source defining the network time source.

5. The device of claim 1 wherein the real-time data is sourced from a global positioning system satellite and the network time source is a GPS receiver.

6. The device of claim 1 wherein the real-time data is sourced from a carrier time source defining the network time source.

7. The device of claim 1 wherein the real-time data is sourced from a website accessible over the wireless network, the website defining the network time source.

8. The device of claim 1 wherein the operating protocol commands are sent over the wireless network from a network operations center configured as a web portal, whereby a user can access and selectively control the device over the wireless network.

9. The device of claim 1 wherein the wireless network is selected from the group consisting of a cellular network, a satellite network, a two-way narrowband wireless data network, a personal area network (PAN), a local area network (LAN), a metropolitan area network (MAN), a wide area network (WAN), and a transmission control protocol/internet protocol (TCP/IP) network.

10. The device of claim 1 wherein the real-time data is embedded in a signal of the wireless network.

11. The device of claim 1 further comprising a back-up power supply so as to provide voltage to the microprocessor in the event that the one or more electrical apparatuses lose power.

12. The device of claim 1 further comprising:

a means for storing in the microprocessor a nominal voltage for each electrical apparatus; and a means for reading an operating voltage for the electrical apparatus and comparing the operating voltage to the nominal voltage so as to monitor operation of the electrical apparatus.

13. The device of claim 12 wherein:

the electrical apparatus comprises a light; and a proportional reduction of the operating voltage relative to the nominal voltage indicates light failure.

14. The device of claim 1 further comprising a means for measuring energy consumption for each electrical apparatus, whereby the processor/transceiver control unit monitors the energy consumption of each electrical apparatus and controls power thereto according to at least one of the energy consumption and the operating protocol commands associated with the respective electrical apparatus.

15. The device of claim 14 wherein:

the processor/transceiver control unit further comprises one or more relays defining channels wired to the microprocessor and on which respective ones of the electrical apparatuses are connected to the processor/transceiver control unit, each relay having an associated current transformer for monitoring circuit amperage;

the means for measuring energy consumption for each electrical apparatus comprises energy measurement circuitry on each channel electrically connected to both the associated current transformer and a voltage sense input parallel to the respective current transformer and configured for monitoring circuit voltage, the current transformer and the voltage sense input being electrically connected to the respective electrical apparatus, wherein the current transformer, the voltage sense input, and the energy measurement circuitry are electrically connected downstream of the respective relay, the energy measurement circuitry being configured to calculate energy from circuit amperage data supplied by the respective current transformer and circuit voltage data supplied by the respective voltage sense input.

16. A device for controlling one or more electrical apparatuses comprising a processor/transceiver control unit connected to each electrical apparatus, the processor/transceiver control unit comprising:

at least one microprocessor storing operating protocol commands as sent over a wireless network, software code, and a latitude and longitude coordinate of the device, the microprocessor accessing real-time data and calculating sunrise and sunset times for the device for a given date based on the latitude and longitude coordinate and the real-time data;

an RF transceiver connected to the microprocessor, the RF transceiver and microprocessor being configured in cooperation with the software code to receive the operating protocol commands and/or the latitude and longitude coordinate from a remote location; and one or more relays connected between the at least one microprocessor and the one or more electrical apparatuses, whereby the device controls power to the one or more electrical apparatuses via the one or more relays according to the operating protocol commands at real-time in conjunction with the latitude and longitude coordinate of the device and thus the calculated date-specific sunrise and sunset times.

17. A method of controlling one or more electrical apparatuses wirelessly, comprising the steps of:

wiring a processor/transceiver control unit between a power source and each electrical apparatus;

programming the processor/transceiver control unit with an operating protocol and software code;

communicating with the control unit over a wireless network;

storing in the processor/transceiver control unit real-time data and a latitude and longitude coordinate for the processor/transceiver control unit;

calculating sunrise and sunset times for the processor/transceiver control unit for a given date based on the latitude and longitude coordinate and the real-time data; and controlling power to the one or more electrical apparatuses according to the operating protocol at real-time in conjunction with the latitude and longitude coordinate of the processor/transceiver control unit and thus the calculated date-specific sunrise and sunset times.

18. The method of claim 17 comprising one or more of the further steps of:

executing as the operating protocol an on demand command sent over the wireless network;

executing as the operating protocol a temporary schedule stored in the processor/transceiver control unit for the days and times not overridden by an on demand command; and executing as the operating protocol a permanent schedule stored in the processor/transceiver control unit for the days and times not overridden by an on demand command and a temporary schedule.

19. The method of claim 17 comprising the further steps of:

setting the number of electrical apparatuses wired to the processor/transceiver control unit;

determining a nominal voltage of the processor/transceiver control unit based on the number of electrical apparatuses;

reading an actual operating voltage when the processor/transceiver control unit and its associated electrical apparatuses are powered; and comparing the operating voltage to the nominal voltage to assess the performance of the electrical apparatuses.

20. The method of claim 17 comprising the further steps of measuring the energy consumption on each channel of a device to which a respective electrical apparatus is connected;

reporting an alarm condition when the measured energy consumption on a particular channel differs by a threshold amount from an initial energy baseline for the particular channel; and selectively controlling the respective electrical apparatus according to at least one of the energy consumption and the operating protocol associated with the respective electrical apparatus.

21. The method of claim 17 comprising the further steps of:

receiving at the processor/transceiver control unit the real-time data as sourced from the wireless network; and keeping the real-time data in a clock circuit of the processor/transceiver control unit as enabled by the software code.

22. The method of claim 17 comprising the further step of sending the latitude and longitude coordinate to the processor/transceiver control unit.

* * * * *